US010068284B1

(12) United States Patent
Zisk et al.

(10) Patent No.: US 10,068,284 B1
(45) Date of Patent: Sep. 4, 2018

(54) GRAPHICAL USER INTERFACE HAVING SCROLLABLE, VISUAL REPRESENTATION OF HISTORICAL PRODUCT SEARCHES AND DIRECT SHOPPING CART LINKS

(71) Applicant: SNOWFALL TECHNOLOGIES LLC, Dallas, TX (US)

(72) Inventors: Jeffrey B. Zisk, Dallas, TX (US); Stephen Fox, Dallas, TX (US)

(73) Assignee: SNOWFALL TECHNOLOGIES LLC, Dallas, TX (US)

( * ) Notice: Subject to any disclaimer, the term of this patent is extended or adjusted under 35 U.S.C. 154(b) by 0 days.

(21) Appl. No.: 15/856,534

(22) Filed: Dec. 28, 2017

Related U.S. Application Data

(60) Provisional application No. 62/551,481, filed on Aug. 29, 2017, provisional application No. 62/582,409, filed on Nov. 7, 2017.

(51) Int. Cl.
*G06Q 30/00* (2012.01)
*G06Q 30/06* (2012.01)
(Continued)

(52) U.S. Cl.
CPC ....... *G06Q 30/0643* (2013.01); *G06F 3/0485* (2013.01); *G06F 3/04842* (2013.01);
(Continued)

(58) Field of Classification Search
CPC .... G06Q 30/06–30/0645; G06Q 30/08; G06Q 50/01
See application file for complete search history.

(56) References Cited

U.S. PATENT DOCUMENTS 5,454,104 A * 9/1995 Steidlmayer .......... G06Q 40/02
6,070,149 A 5/2000 Tavor et al.
(Continued)

FOREIGN PATENT DOCUMENTS

| CN | 104331471 A | 11/2014 |
| WO | WO 2013/013091 A1 | 1/2013 |
| WO | WO 2015/028607 A1 | 3/2015 |

OTHER PUBLICATIONS

J. Xu, I. Benbasat and R. T. Cenfetelli, "Does Live Help Service Matter? An Empirical Test of the DeLone and McLean's Extended Model in the E-Service Context," 2010 43rd Hawaii International Conference on System Sciences, Honolulu, HI, 2010, pp. 1-10. (Year: 2010).*

(Continued)

*Primary Examiner* — Adam L Levine
(74) *Attorney, Agent, or Firm* — Haynes and Boone, LLP

(57) ABSTRACT

A method that includes providing a graphical user interface ("GUI") adapted to display a chat session; displaying a visual representation of a product for a plurality of products in a first dialog box; after displaying the first dialog box, receiving an input parameter from a user that relates to a first subset of the plurality of products; displaying, in response to the receipt of the input parameter, a second dialog box that comprises visual representations of the products in the first subset at a location that is between the first dialog box and an interface boundary of the GUI; receiving a first scrolling command; and simultaneously moving the first and second dialog boxes towards the interface boundary in response to the receipt of the first scrolling command and/or adding a product directly to a virtual shopping cart of the user using an add-to-cart indicator associated with each visual representation.

10 Claims, 13 Drawing Sheets

(51) Int. Cl.
  *G06F 3/0484* (2013.01)
  *H04L 12/58* (2006.01)
  *G06F 3/0485* (2013.01)
  *G06Q 30/02* (2012.01)

(52) U.S. Cl.
  CPC ..... *G06Q 30/0601* (2013.01); *G06Q 30/0641* (2013.01); *H04L 51/04* (2013.01); *G06Q 30/0271* (2013.01)

(56) References Cited

U.S. PATENT DOCUMENTS

| | | | |
|---|---|---|---|
| 7,328,177 B1 | 2/2008 | Lin-Hendel | |
| 7,503,007 B2 * | 3/2009 | Goodman | G06Q 10/107 |
| | | | 707/999.104 |
| 7,890,876 B1 * | 2/2011 | Mandelbaum | G06Q 10/10 |
| | | | 715/758 |
| 8,452,653 B1 | 5/2013 | Gottfurcht et al. | |
| 9,251,471 B2 | 2/2016 | Pinckney et al. | |
| 9,483,778 B2 | 11/2016 | Tuzhilin et al. | |
| 9,697,529 B2 | 7/2017 | Fischer et al. | |
| 2001/0047386 A1 | 11/2001 | Domenikos et al. | |
| 2002/0059098 A1 * | 5/2002 | Sazawa | G06Q 30/0256 |
| | | | 705/14.54 |
| 2014/0081750 A1 | 3/2014 | Hosp | |
| 2014/0136361 A1 | 5/2014 | Brazell | |
| 2014/0344102 A1 | 11/2014 | Cooper | |
| 2015/0019373 A1 | 1/2015 | Carbonell et al. | |
| 2015/0154303 A1 * | 6/2015 | Shin | G06F 17/30867 |
| | | | 707/722 |
| 2016/0006856 A1 * | 1/2016 | Bruno | H04M 1/72547 |
| | | | 715/809 |
| 2016/0092949 A1 | 3/2016 | Masenza et al. | |
| 2016/0217515 A1 | 7/2016 | Vijayaraghavan et al. | |
| 2016/0284008 A1 | 9/2016 | Munjal et al. | |
| 2018/0145937 A1 * | 5/2018 | Choi | H04L 51/046 |

OTHER PUBLICATIONS

Ethier, Jean; "Essays on Web Site Interface Design and Emotions Felt by Customers during Online Shopping Episodes," Order No. NR06703, HEC Montreal (Canada). https://dialog.proquest.com/professional/docview/276375213?accountid=161862; 162pp., (2005). (Year: 2005).*

* cited by examiner

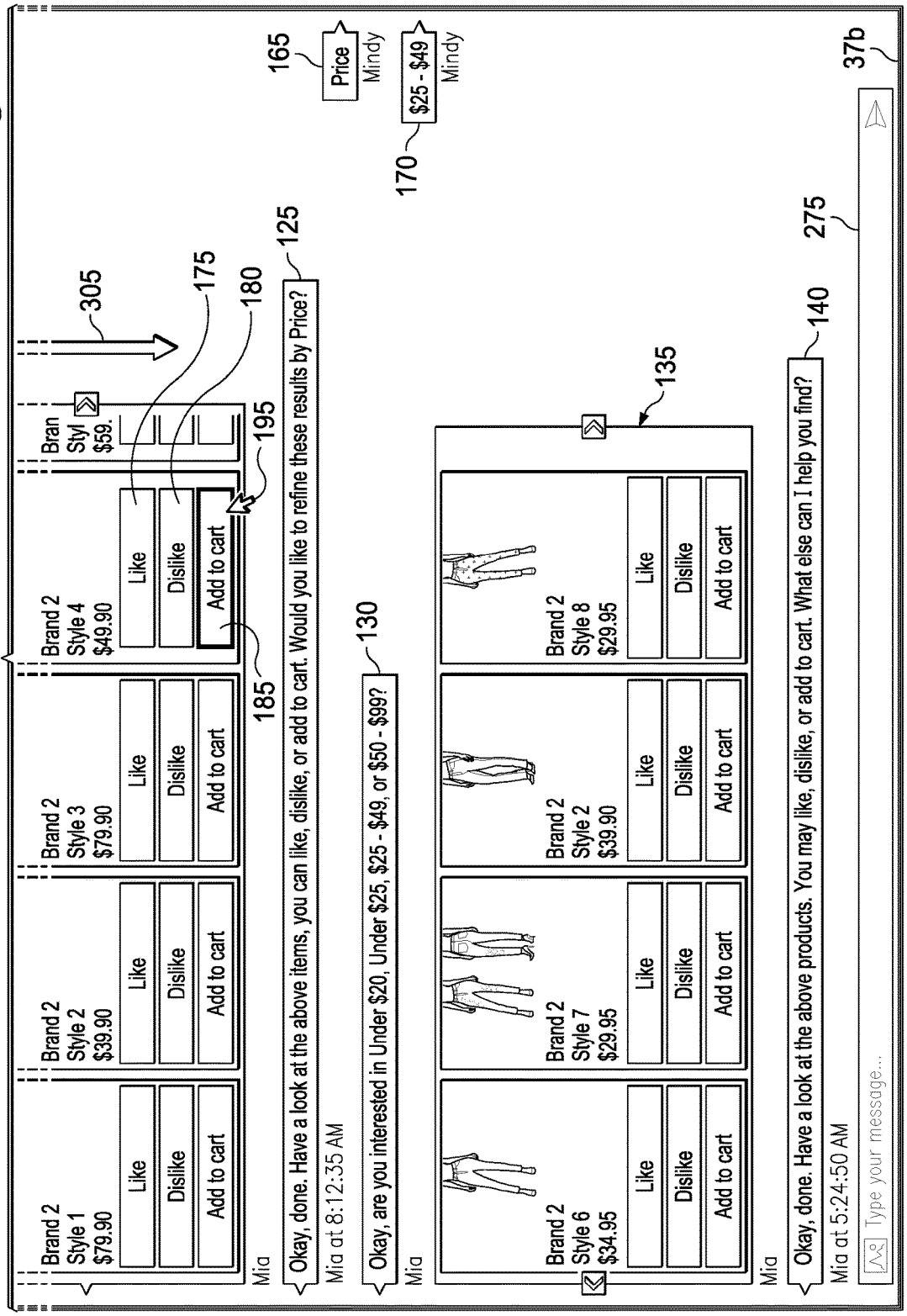

GRAPHICAL USER INTERFACE HAVING SCROLLABLE, VISUAL REPRESENTATION OF HISTORICAL PRODUCT SEARCHES AND DIRECT SHOPPING CART LINKS

CROSS-REFERENCE TO RELATED APPLICATIONS

This application claims the benefit of the filing date of, and priority to, U.S. Application No. 62/551,481, filed Aug. 29, 2017, the entire disclosure of which is hereby incorporated herein by reference.

This application also claims the benefit of the filing date of, and priority to, U.S. Application No. 62/582,409, filed Nov. 7, 2017, the entire disclosure of which is hereby incorporated herein by reference.

BACKGROUND

Generally, during online shopping, a user searches for a specific product by navigating through multiple general category pages and eventually searching a desired sub-category or sub-sub-category product page. This navigation to the desired sub-category product page may occur through the application of one or more filters, which filter out the products that do not meet the user's desired attributes, such as price, etc. Normally, when presented with a first selection of products on a first category webpage, the user must click on, or otherwise select, his or her filter parameter, which then replaces the first webpage with a second webpage displaying a second selection (based on the filter parameter) of products. Generally, the second selection of products is a sub-set of the first selection of products. These filter parameters are often located on a left-hand filtering sidebar of the category page. Alternatively, the user may choose to open a new tab or browsing session such that the second webpage is displayed separately from the first webpage, in order to preserve the first webpage. Thus, if and when the user wishes to remove the filter parameter to view the first selection of products on the first webpage, the user must either remove the filter parameter from the second webpage such that the first webpage displaying the first selection of products is displayed again, hit a "back" button to again display the first webpage with the first selection of products, or click between the tabs associated with each of the first and second webpages. Each of the actions requires a click-based (or equivalent) action from the user to toggle between the first and second webpages, and thus first and second selections of products. Thus, the user is not provided a visual representation of the first selection of products while simultaneously viewing the second selection of products. This can slow the selection process or even prevent the user from selecting a product, as the user often becomes "lost" during the navigation between category and sub-category pages. Often, even when the user finds and is ready to purchase a product, the user is required to visit the product page to select a size and color of the product prior to adding the product to the user's electronic or virtual shopping cart.

Human or bot-created chat/messaging interactions with the user can simplify product searches for the consumer, but the method of filtering through the category pages to category sub-pages is generally the same except that the user is "asked" questions that correspond with the filters. That is, instead of the user selecting a size 8 in a left-hand filtering sidebar, the user responds with "size 8" via a dialogue box when asked which size he or she is looking for. When a desired product is displayed in the dialogue box, the user is required to click-through to a product page, at which point the user can add the product to the user's electronic shopping cart. Generally, in order to add the product to the user's electronic shopping cart from the product page, the user is still required to select a size—regardless of whether the user applied a filter involving a size—and a color before clicking on an "add to cart" button. Moreover, after clicking on the "add to cart" button, the user is often taken directly to his or her shopping cart and then has the option of returning to his or her search results or proceeding to payment. As the user is required to click-through to the product page prior to adding the product to the user's shopping cart, and/or is required to click out of the shopping cart, the user is less likely to return to the dialogue and/or less likely to purchase the selected item.

BRIEF DESCRIPTION OF THE DRAWINGS

FIGS. 6A and 6B together form the chat session of FIG. 5, according to an example embodiment.

DETAILED DESCRIPTION

Figure 1:
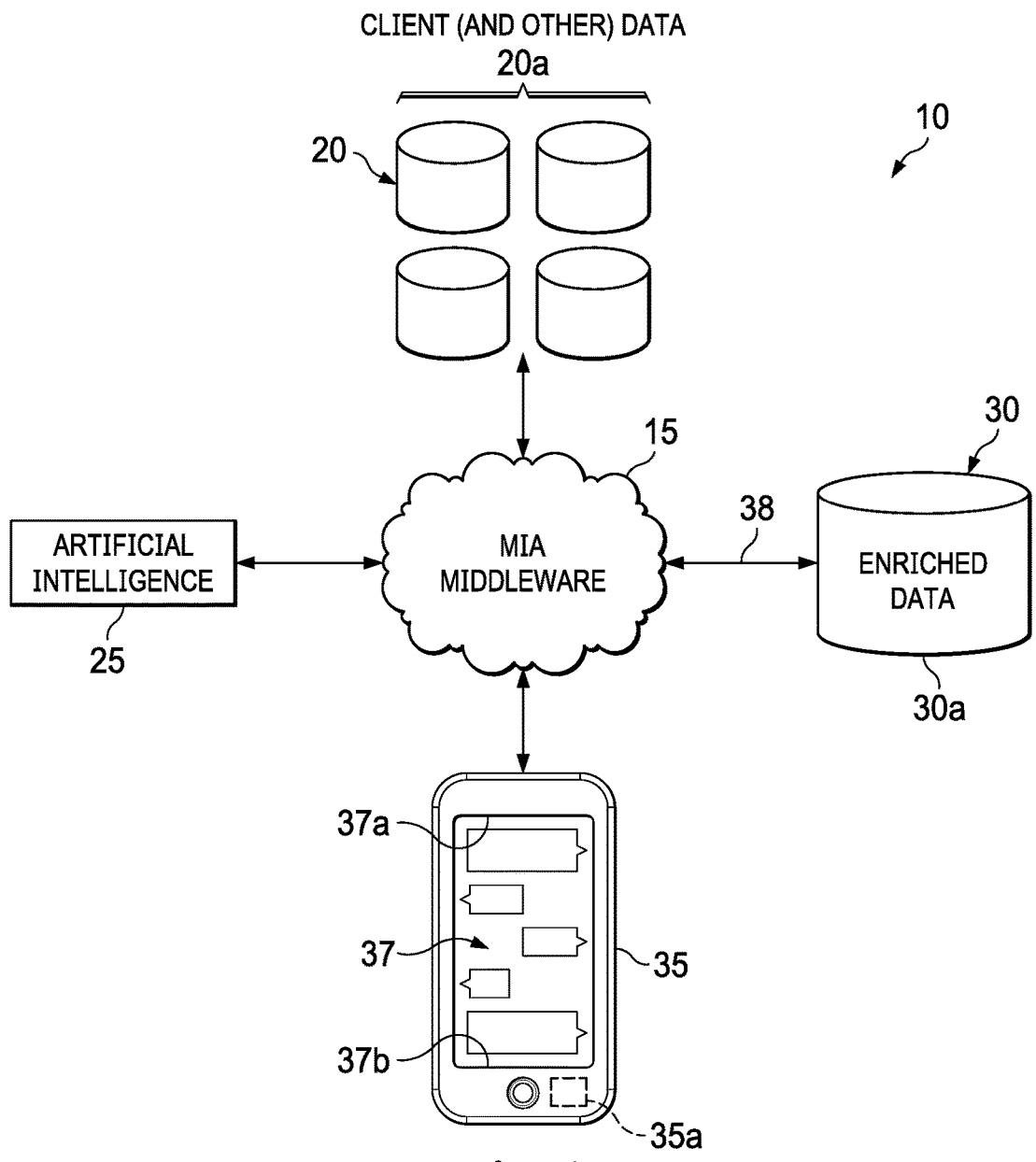
FIG. 1 is a diagrammatic illustration of a system according to an example embodiment, the system including a computing device on which a graphical user interface is displayed.

In an example embodiment, referring to FIG. 1, the system 10 includes Mia™ Middleware 15 ("Mia Middleware 15"), which is operably coupled to each of the following: one or more databases 20 that have memory and that store client data 20a; artificial intelligence ("AI") 25 (company developer or 3$^{rd}$ party integration); one or more databases 30 that have a memory and that store enriched data 30a; and a computing device 35 on which a graphical user interface ("GUI") 37 is displayed. Generally, the computing device 35 includes a processor 35a. In an example embodiment, the Mia Middleware 15, the one or more databases 20, the one or more databases 30, the AI 25, and the computing device 35, are operably coupled or in communication via a network 38. Generally, the GUI 37 defines an upper interface boundary 37a and an opposing lower interface boundary 37b in a vertical direction and is adapted to display a visual representation of historical product searches having direct shopping cart links.

The Mia Middleware 15 uses a vast collection of data, both structured and unstructured, and transforms it into a multi-faceted user profile to create actionable insights for use by retailers. The data used to build this user profile includes user data gathered through multiple channels, directly and indirectly, by the Mia Middleware 15 such as: user data captured by traditional retailers in physical stores including purchase history, time shopped, response to promotions and more; and user data from a user's online activity on the retailer's websites. User data often includes products viewed online, products purchased, basic user profile information such as name, shipping addresses, age, and gender, products marked as "favorites" and more. In some embodiments, the data used to build the user profile includes user data captured through user-facing products of the Mia Middleware 15, such as a Mia™ Personal Shopper, or Conversational Commerce, which refers to a user communication experience involving filtering, presenting, and purchasing products. This type of user data includes: answers to questions asked in natural conversation; data captured when a user responds with likes, dislikes, and purchases of products displayed by the Mia Middleware 15; and information shared in natural conversation. In some embodiments, the data used to build the user profile includes data captured through scraping the user's social media posts (e.g., on Facebook® & Twitter®) and the retailer's product data including descriptions, taxonomy, meta-data, attributes, reviews and more. In some embodiments, the user "logs in" to the Mia Middleware 15 using an identifier, a password, etc., but in other embodiments the Mia Middleware 15 identifies a user based on an IP address, browser fingerprinting, etc. In other embodiments, a user of the Mia Middleware 15 may remain anonymous (i.e., not be required to expressly provide identifying information), yet a user profile is still created based on the interaction between the user and the Mia Middleware 15 while the user remains anonymous. In some embodiments, the Mia Middleware 15 also creates a profile for a person who is associated with the user, but who is not the user. That is, the user can provide data for another person and identify that person as a family member, a coworker, a friend, a family member's friend, etc. The type of data and the method of obtaining the data for the profile of the other person may include or be similar to the type of data and the method of obtaining the data for the user. Additionally, the user's inputs regarding the other person may be used to build the profile for the other person.

The Mia Middleware 15 transforms this data, or the enriched data 30a, into a comprehensive set of cognitive services, which provide actionable insights for selling products more efficiently to customers, and for helping the customers to shop more efficiently because products that are shown via the GUI 37 to the customers more closely match their preferences.

Figure 2:
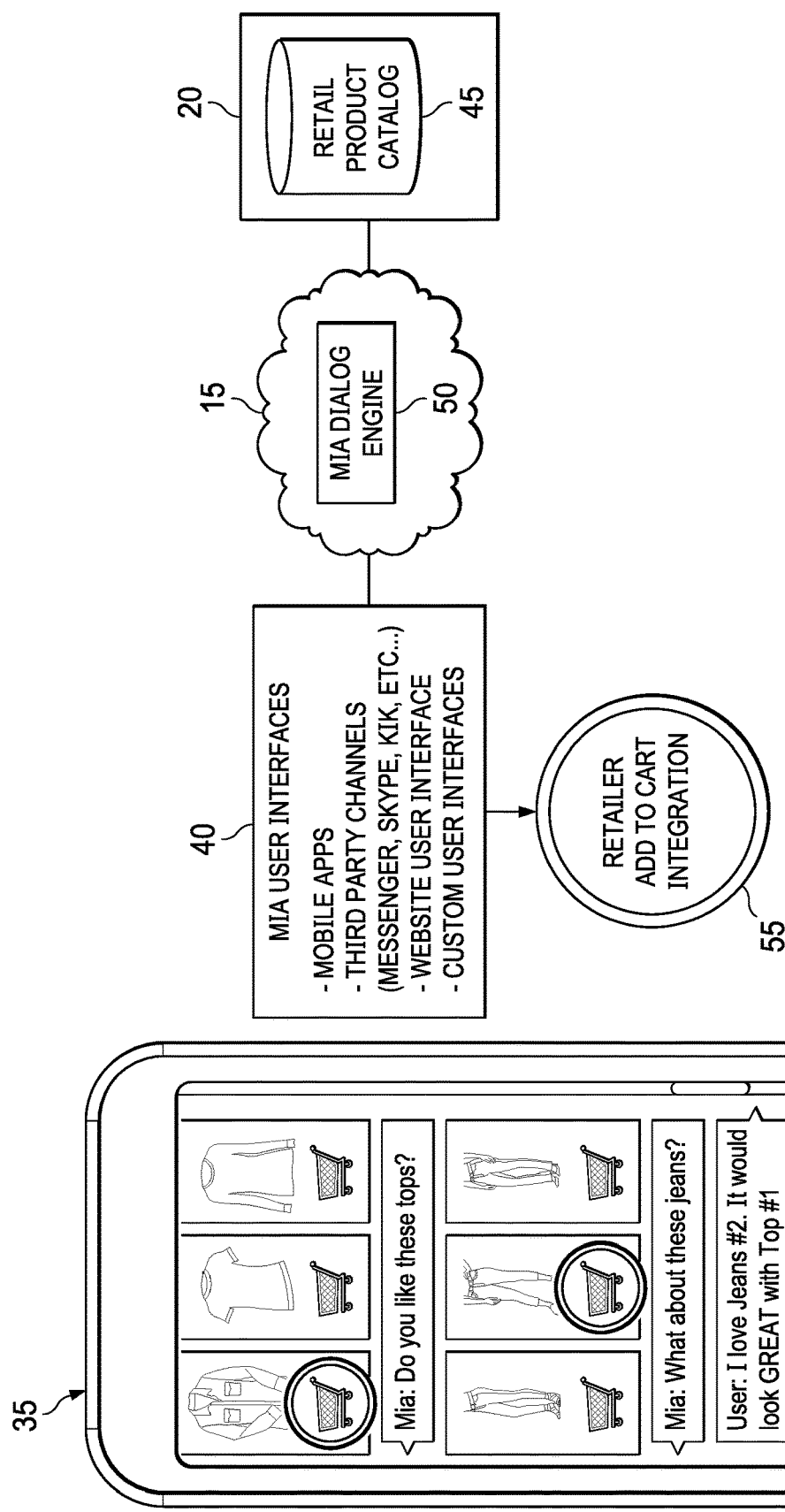
FIG. 2 is a diagrammatic illustration of a portion of the system of FIG. 1, according to an example embodiment.

FIG. 2 is a diagrammatic illustration of a portion of the system 10, according to an example embodiment. Some of the data used by the Mia Middleware 15 comes from retailer channels and is provided 'as-is' to the Mia Middleware 15, while other data is explicitly collected through the Mia Middleware 15 via Conversational Commerce using user interface(s) 40 (including the GUI 37) in order to enhance the user's profile and enhance the capabilities of the analyses. Other data used by the Mia Middleware 15 includes a retail product catalog 45, which may be stored in the one or more databases 20. The Mia Middleware 15 includes a Mia Dialog Engine 50, which is an application programming interface for implementing conversations or electronic chat sessions. The Mia Dialogue Engine 50 supports natural language conversation that is tied to a particular user's account, as well as non-text messages such as liking or disliking a product via the user interface(s) 40, for which the Mia Middleware 15 does real-time data analysis to create a feedback loop. The system 10 also includes "retailer add-to-cart integration" 55. In an example embodiment, the profile data for the person other than the user is gathered by the Mia Middleware 15.

Figure 3:
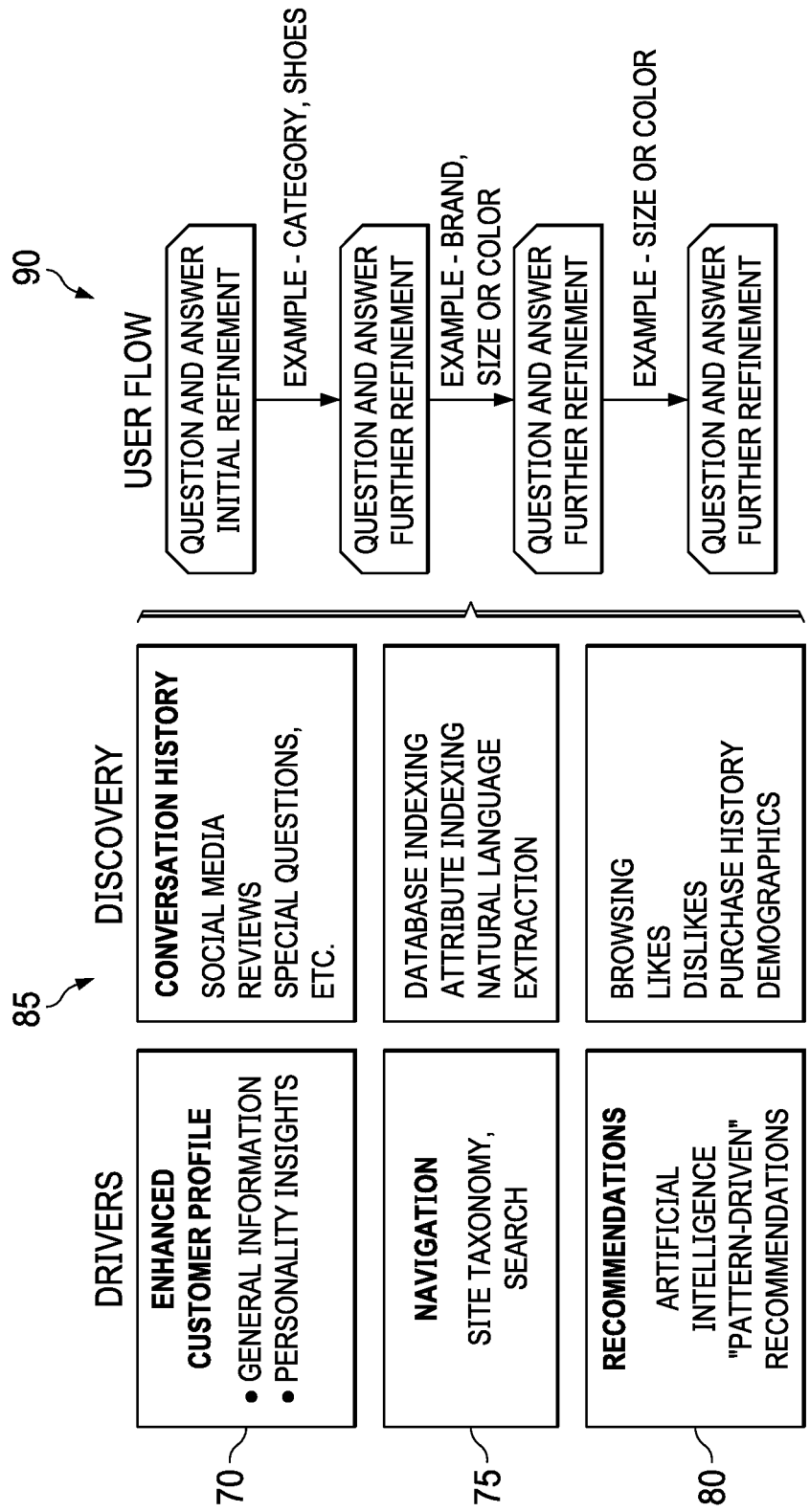
FIG. 3 is a data and process flow diagram for the system of FIG. 1, according to an example embodiment.

FIG. 3 illustrates a data and process flow for the system 10, according to an example embodiment. The system 10 uses enhanced data that includes "drivers" such as enhanced customer profile data 70, navigation data 75, and recommendation data 80. Moreover, the system 10 uses "discovery" data 85. During a user flow 90 and based on a question-and-answer exchange between the user and the Mia Middleware 15 via Conversational Commerce using the GUI 37, an initial refinement occurs, followed by further refinement using conversation history between the Mia Middleware 15 and the user along with data, and/or using the enhanced customer profile 70.

Figure 4:
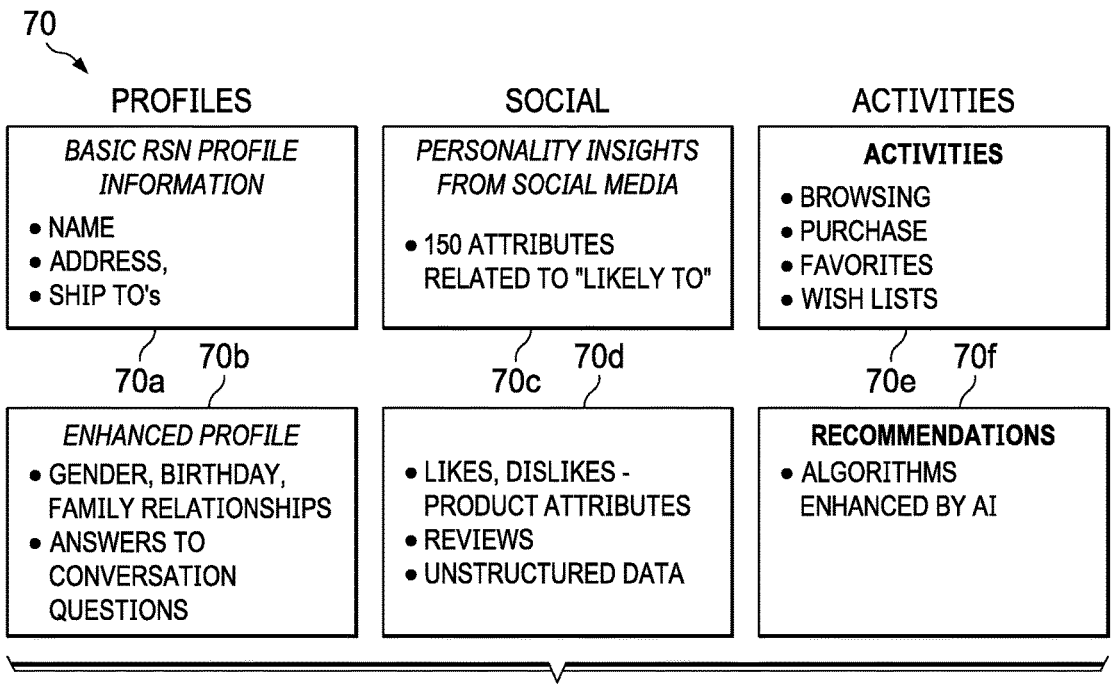
FIG. 4 is a data diagram for the system of FIG. 1, according to an example embodiment.
Figure 12:
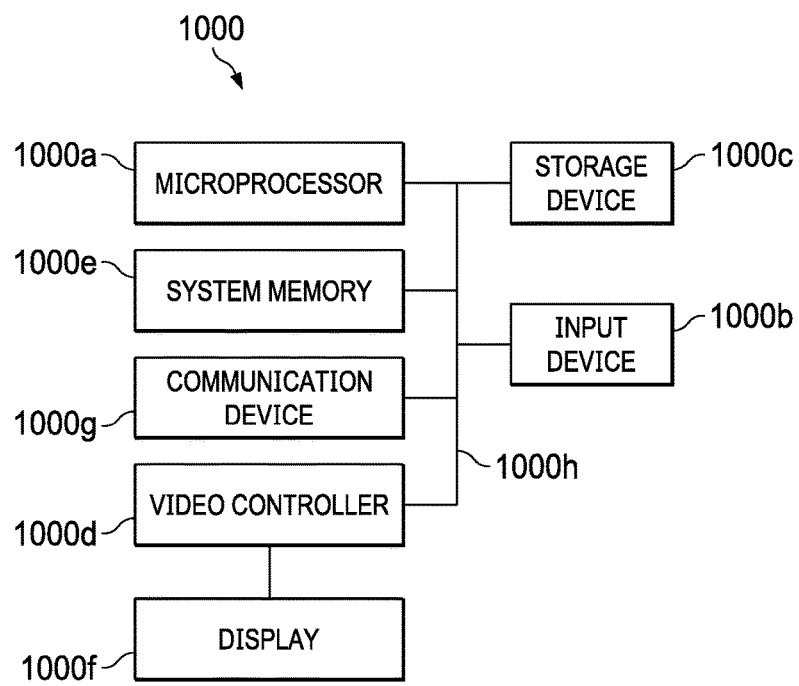
FIG. 12 is a diagrammatic illustration of a node for implementing one or more example embodiments of the present disclosure, according to an example embodiment.

FIG. 4 illustrates data used for the enhanced customer profile 70. The enhanced customer profile 70 includes profile information such as basic retailer profile information 70a and enhanced profile information 70b. The enhanced customer profile 70 also includes social data, such as personality insights from social media 70c and unstructured data 70d such as likes, dislikes, reviews, etc. The enhanced customer profile 70 also includes activity data, such as activity data 70e and recommendations 70f. In an example embodiment, the enhanced customer profile 70 includes profile information for the user and/or for one or more people other than the user.

Figure 5:
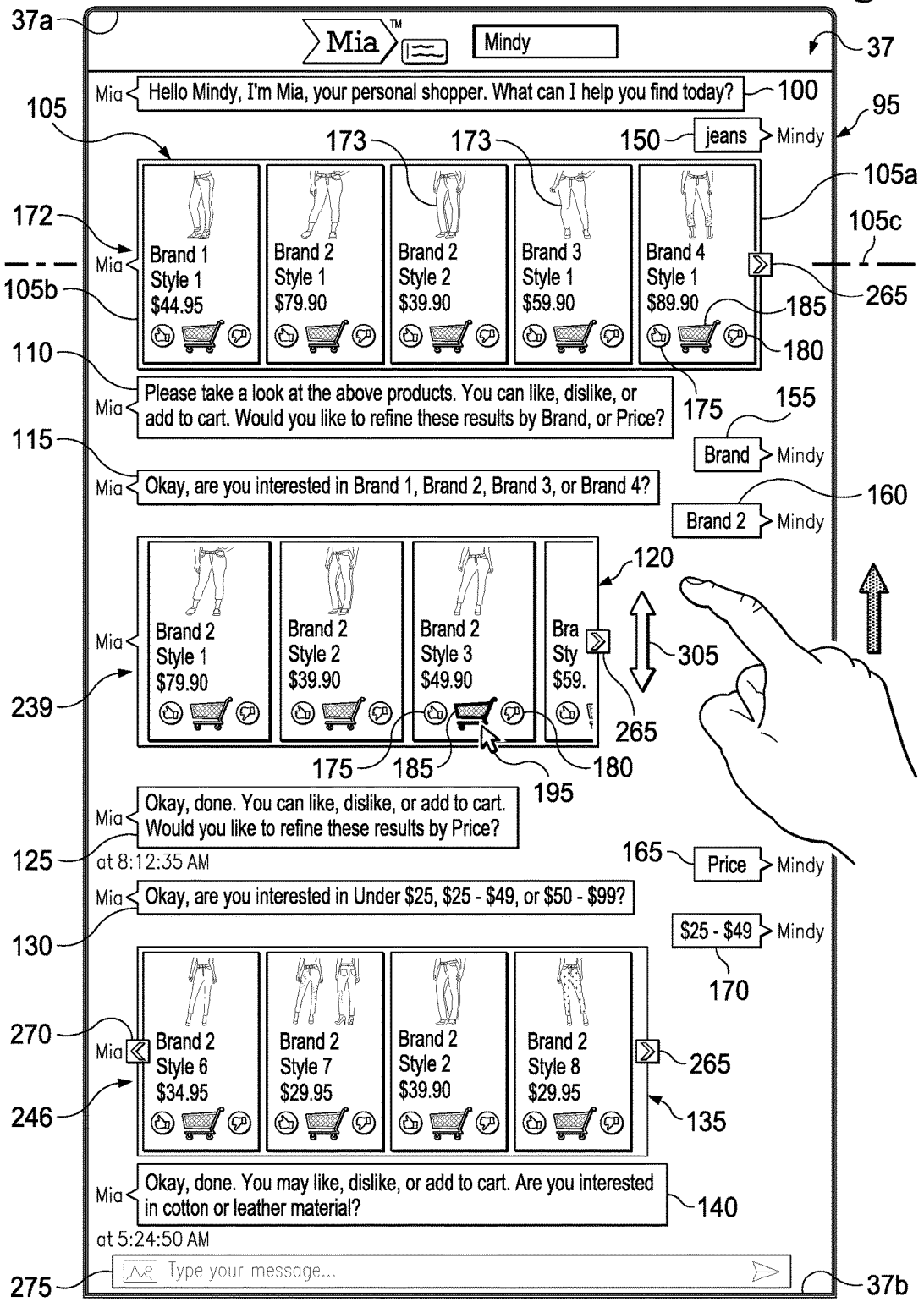
FIG. 5 is an illustration of a chat session displayed on the graphical user device of FIG. 1, according to an example embodiment, the chat session including a plurality of dialogue boxes.
Figure 6A:
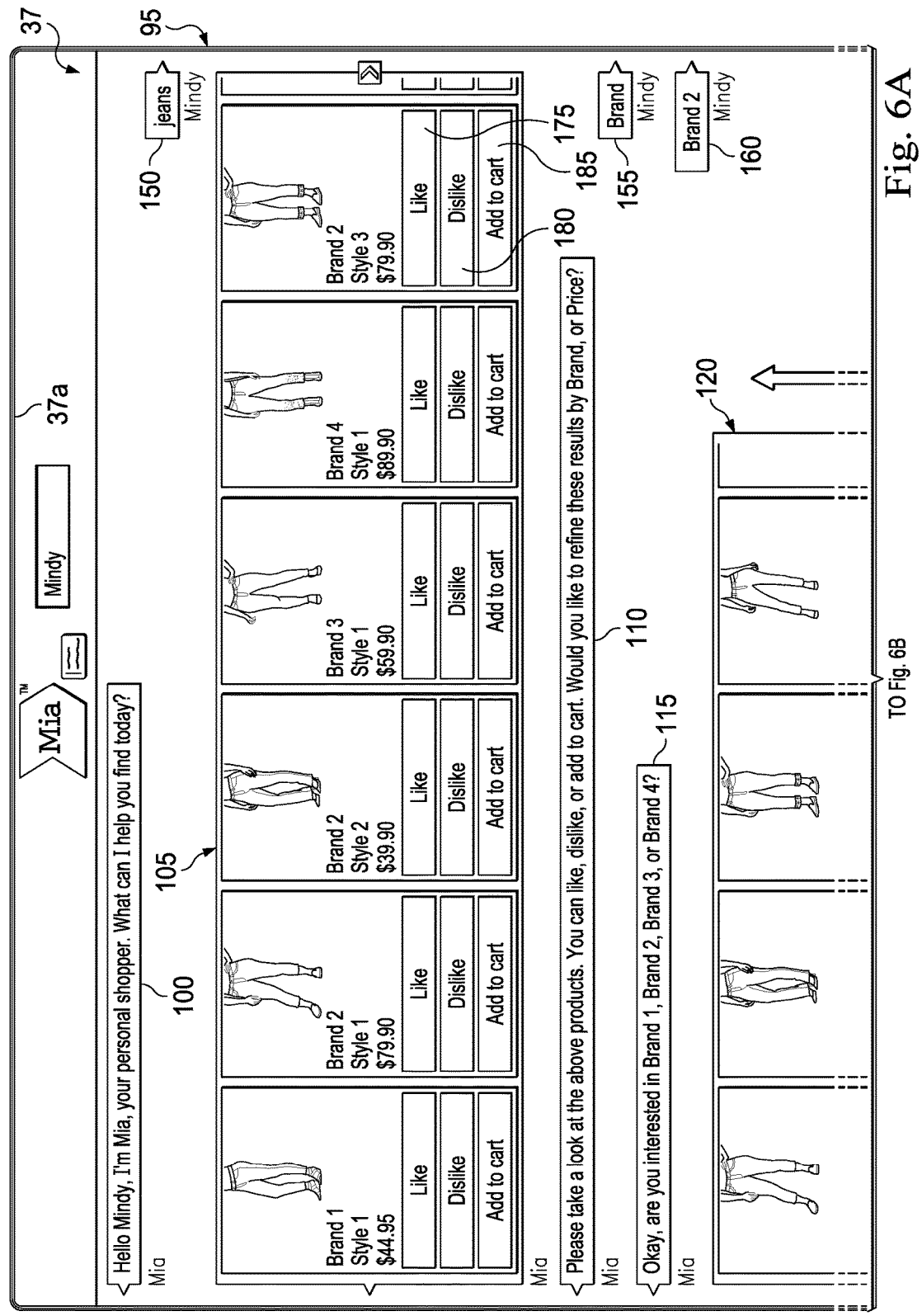

In operation and as illustrated in FIG. 5, an electronic chat session 95 is displayed on the GUI 37 of the computing device 35. FIGS. 6A and 6B are enlarged portions of FIG. 5, and illustrate additional details. The chat session 95 includes dialogue generated by the Mia Middleware 15 in windows, or dialogue boxes 100, 105, 110, 115, 120, 125, 130, 135, and 140. The chat session 95 also includes dialogue or input from the user via windows or dialogue boxes 150, 155, 160, 165, and 170. The Mia Middleware 15 uses the user inputs from the dialogue boxes 150, 155, 160, 165, and 170 to filter and/or predict which products should be displayed in one or more of the dialogue boxes 100, 105, 110, 115, 120, 125, 130, 135, and 140. In this embodiment, Conversational Commerce, or the method of filtering, presenting, and purchasing product(s) via the chat session 95, is a user experience that allows users to communicate (typing or speaking) with an artificial intelligence personal shopper to help them find products they are most interested in and most likely to buy. That is, the Mia Middleware 15 generates the dialogue using the AI 25. Media other than a messenger/chat application displayed on the computing device 35 can provide the Conversational Commerce user experience. For example, in some embodiments, a voice-based Conversational Commerce interface may be delivered to a user in a brick and mortar store, in a virtual reality/augmented reality store, or through another audio-based system.

With conventional systems, search and navigation are primarily focused on one-way communication (mapping a "search query" to a list of results) and implicit preference gathering via technologies such as pixel tracking and abandoned shopping carts. In contrast, Conversational Commerce seeks to gather information from users by asking natural questions to improve the products being shown to the user. Information gathered in a conversation can improve a single user's shopping experience by merit of learning that user's individual preferences in a particular session. This information can also be used to improve the product catalog by learning explicitly why users do or do not select certain products. This information is gathered through natural conversation with a user as shown in the dialogue boxes 100-170.

For example, upon asking what the user is looking for via the dialogue box 100, the user responds with "jeans" via the dialogue box 150. In response to the input via the dialogue box 150 in addition to the use of the data forming the enhanced customer profile 70, the Mia Middleware 15 provides a plurality of products 172 to the user via the dialogue box 105. Each product in the plurality of products 172 is associated with product information or product data. Generally, the product information includes a picture of the product, or a visual representation of the product, feedback indicators, and/or an "add to cart" button/indicator. As shown in FIG. 5, the product information includes a visual representation 173 of the product, a "like" feedback indicator 175, a "dislike" feedback indicator 180, and an "add to cart" indicator 185. Each of the indicators 175, 180, and 185 is selectable by the user to provide input or feedback to the system 10. Thus, the user can provide input to the Mia Middleware 15 not only through the dialogue boxes 150, 155, 160, 165, and 170, but also through the indicators 175 and 180. The Mia Middleware 15 learns from a user's "likes" and "dislikes" via the indicators 175 and 180, respectively, and responds in real time throughout the chat session 95. The Mia Middleware 15 stores an analysis of a user from each conversation, which provides pattern-based analysis of a user over time.

An example of a chat session in which the Mia Middleware 15 responds in real time to the user's input is set forth below:
Mia: Hi, I'm Mia, your personal shopper. What can I help you find today?
Jane: Hi, Mia. I'm looking for a new pair of jeans.
Mia: Sure, we have lots of jeans. What style are you looking for?
Jane: I'm looking for boot cut jeans.
Mia: Have a look at these ones that we have in your size. What do you think?
Jane: <presses the like button for three different pairs>
Mia: It seems that you like jeans that have a design printed on them. Would you like to see more jeans that are similar to these?
Jane: Yes, that would be great.
Mia: Here are a few others. I also found some belts to go with it. How would you like one of these combinations?<Mia recommends belts that are commonly purchased with the relevant jeans>
Jane: <Selects a belt and jeans combo>
Jane: Thanks, Mia! I can't wait to wear this at my sister's baby shower this weekend!
Mia: Great! I hope you have a good time.

As shown above, the Mia Middleware 15 analyzes the user's inputs regarding the "liked" pairs of jeans via the feedback indicators 175 of the three liked pairs of jeans to determine that the user is looking for jeans having a design printed on them. Moreover, the Mia Middleware 15 suggests items that the user does not request or otherwise mention (i.e., the belt). The Mia Middleware 15 remembers previous conversations and makes connections that a clever human personal shopper would remember. For example:
Mia: Hi, Jane. How was your sister's baby shower? Did your outfit go over well?
Jane: Yes! It was a hit.
Mia: I'm so glad to hear that. Would you like to purchase a gift for your sister?
Maybe you and her would like these matching tops?
Etc. . . .

As shown above, the Mia Middleware 15 also suggests products that are unrelated to searched products. While the belt is a common item associated with jeans, the suggestion to buy a gift for the user's sister is not related to the product searched by the user. Instead, it is based on the user mentioning an upcoming baby shower. This suggestion of an unrelated product increases the likelihood that the user purchases the unrelated product. Moreover, the suggestion of the unrelated product to the user, and feedback from the user in response to the suggestion, allow the Mia Middleware 15 to further refine that user's profile.

Figure 7A:
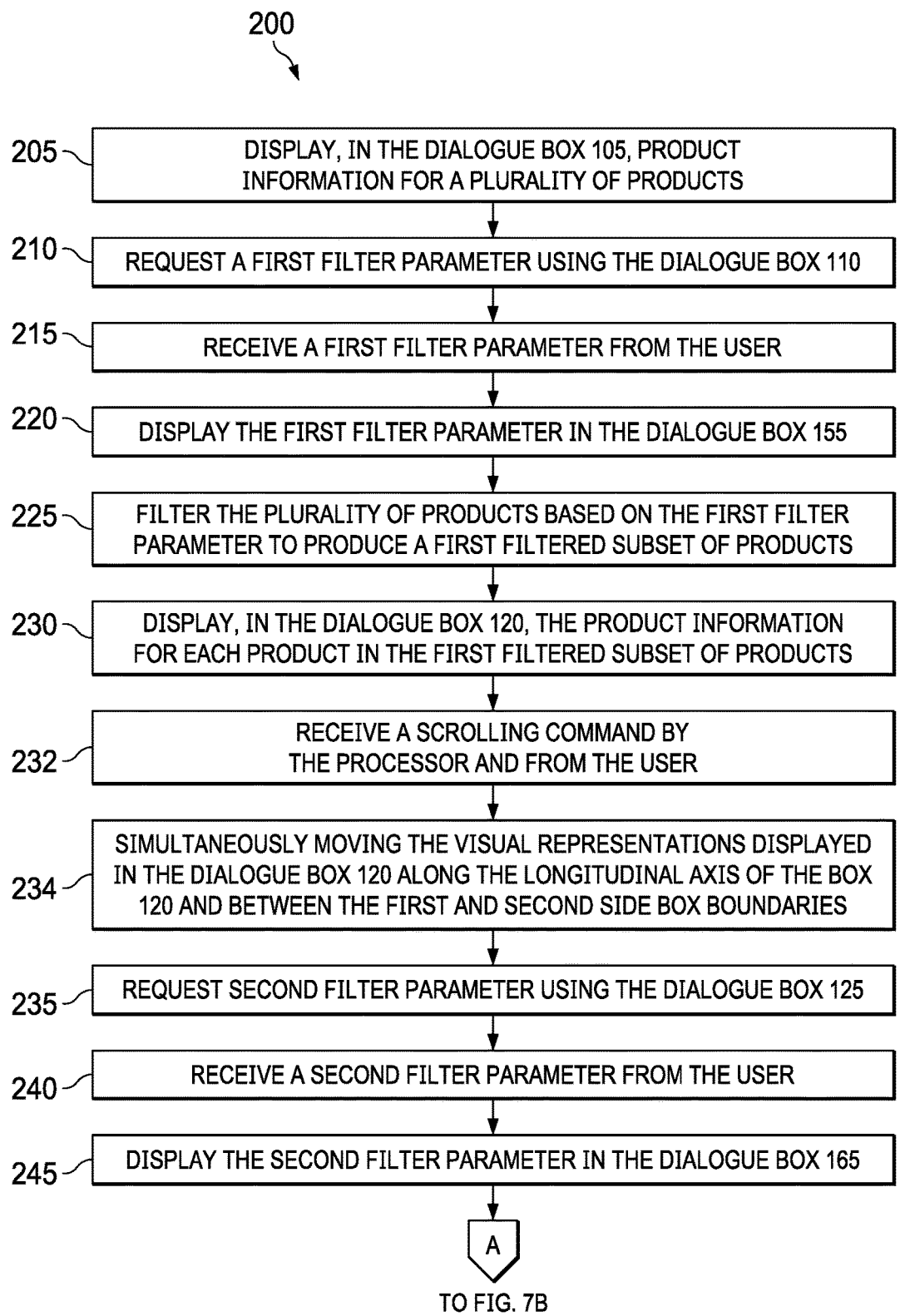
FIGS. 7A and 7B together form a flow chart illustration of a method of operating the system of FIGS. 1-5, 6A, and 6B, according to an example embodiment.
Figure 7B:
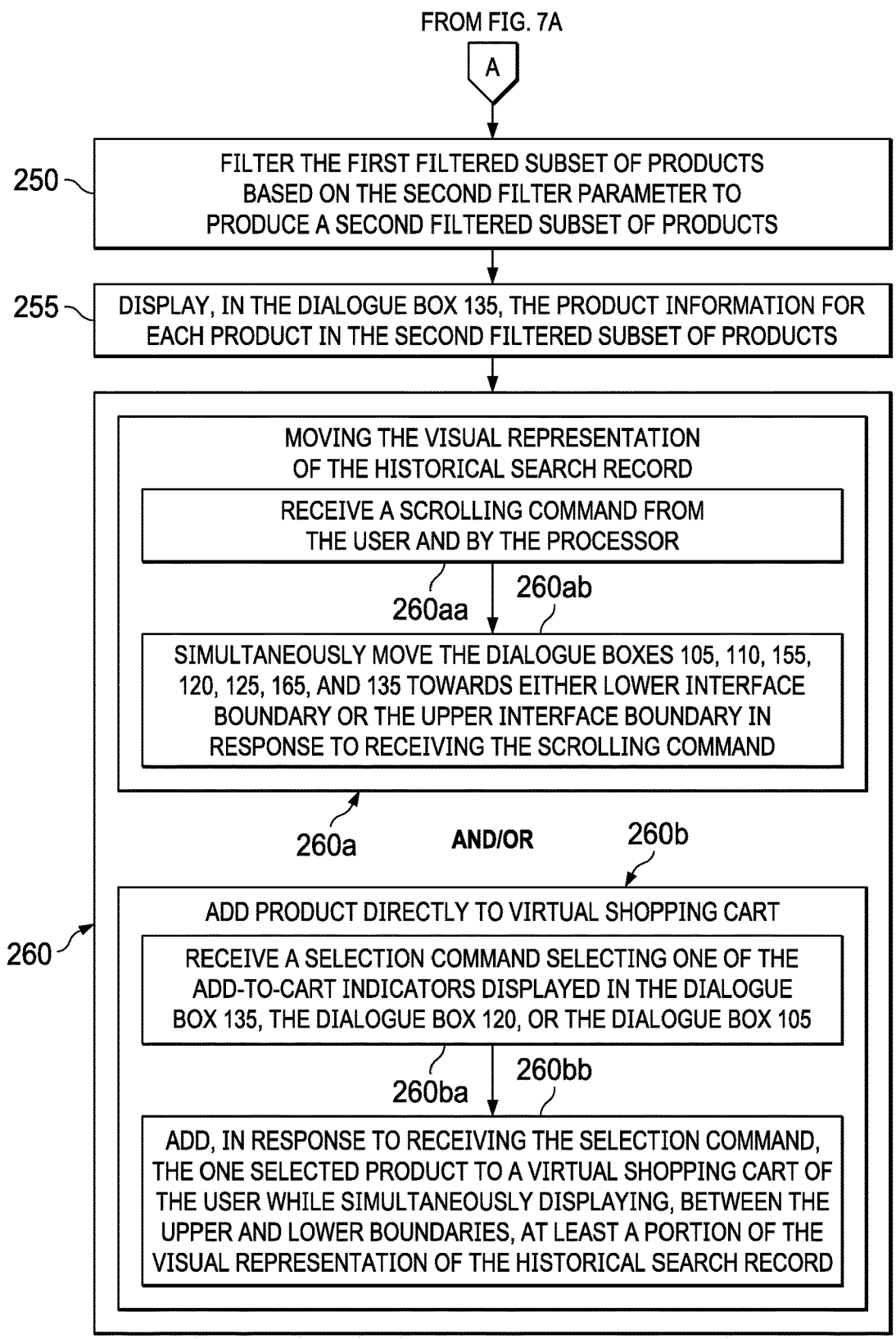

In an example embodiment, as illustrated in FIGS. 7A and 7B with continuing reference to FIGS. 1-5, 6A, and 6B, a method 200 of operating the system 10 includes displaying—in the dialogue box 105—product information for a plurality of products 172 at step 205; requesting a first filter parameter using the dialogue box 110 at step 210; receiving the first filter parameter from a user at step 215; displaying the first filter parameter in the dialogue box 155 at step 220; filtering the plurality of products 172 based on the first filter parameter to produce a first filtered subset of products 239 at step 225; displaying, in the dialogue box 120, the product information for each product in the first filtered subset of products 239 at step 230; receiving a scrolling command from the user at step 232; simultaneously moving the visual representations displayed in the dialogue box 120 along the longitudinal axis of the box 120 and between the first and second side box boundaries at step 234; requesting a second filter parameter using the dialogue box 125 at step 235; receiving the second filter parameter at step 240; displaying the second filter parameter in the dialogue box 165 at step 245; filtering the first filtered subset of products 239 based on the second filter parameter to produce a second filtered subset of products 246 at step 250; displaying, in the dialogue box 135, the product information for each product in the second filtered subset of products 246 at step 255; and moving the visual representation of the historical search record and/or adding a product directly to a virtual shopping cart at step 260.

At the step 205, product information for the plurality of products 172 is displayed in the dialogue box 105. As shown in FIG. 5, the dialogue box 105 displays six products aligned horizontally (or along a longitudinal axis of the dialogue box 105) between a first side box boundary 105a and an opposing second side box boundary 105b of the box 105. Each box or window displayed also includes, respectively, a first side box boundary and an opposing second side box boundary. When the number of products in the plurality of products 172 exceeds a number of products that can easily be viewed within the box 105, a portion of products from the plurality of products 172 is not initially viewable by the user, but is accessible when the system 10 receives a scrolling command from the user as detailed below.

At the step 210, a first filter parameter is requested using the dialogue box 110. Generally, Mia Middleware 15 generates a conversational like question that requests an input parameter and that is presented to the user via the dialogue box 110. As shown in FIG. 5, the system 10 asks the user if he or she would like to refine the results (i.e., the plurality of products 172) by brand or price. More than one filter parameter can be requested and received between the presentation of products and filtering of products.

At the step 215, the system 10 receives the first filter parameter via the dialogue box 155. In some instances, the system 10 receives the first filter parameter when the user enters text into an input box 275 using a keyboard coupled to, or displayed on, the computing device 35, and then submitting the entered text. However, in some embodiments, the system 10 can receive the first filter parameter via a microphone (to be used in a voice recognition module), etc. Moreover, in some instances, the selection of one or more of the feedback indicators 175 and 180 for one or more of the products in the plurality of products 172 is the first filter parameter.

At the step 220, the first filter parameter is displayed in the dialogue box 155. For example, the first filter parameter of "brand" is displayed in the dialogue box 155.

At the step 225, the plurality of products 172 is filtered based on the first filter parameter to produce the first filtered subset of products 239. Filtering the first plurality of products 172 results in a non-conforming subset of the plurality of products. That is, the portion that does not conform to the filter parameter is considered "filtered-out" by the input parameter. The portion that does conform to the filter parameter forms a conforming subset of the plurality of products that is the first filtered subset of products 239.

At the step 230, the product information for each product in the first filtered subset of products 239 is displayed using the dialogue box 120. The first filtered subset of products 239 conforms to the first input parameter. The first filtered subset of products 239 is displayed in the dialogue box 120 in an identical or similar manner to which the first plurality of products 172 is displayed in the dialogue box 105.

Figure 8A:
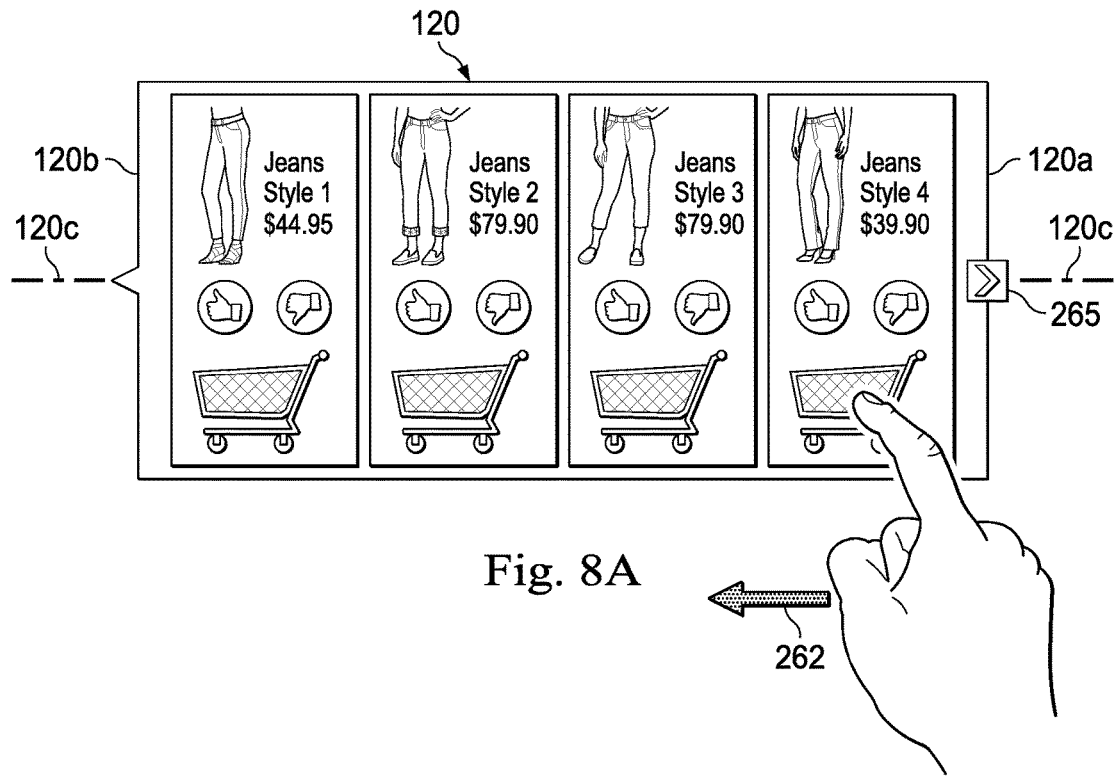
FIG. 8A is a diagrammatic illustration of one of the dialogue boxes of FIG. 5 during the execution of a step of the method of FIGS. 7A and 7B, according to an example embodiment.
Figure 8B:
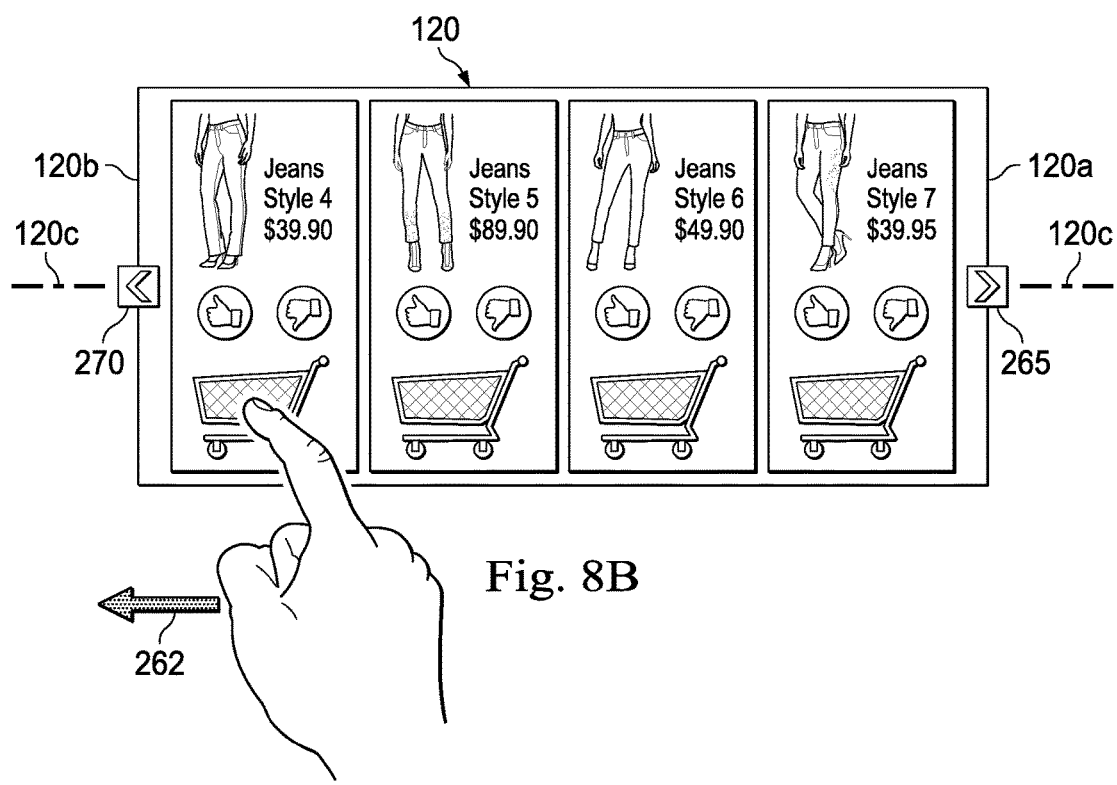
FIG. 8B is another diagrammatic illustration of the dialogue box of FIG. 8A during the execution of the step of the method of FIGS. 7A and 7B, according to an example embodiment.

At the step 232, a scrolling command is received from the user. As illustrated in FIGS. 8A and 8B, the dialogue box 120 defines a horizontal axis 120c relative to which the plurality of products 239 is aligned. The system 10 is capable of receiving a command from the user to horizontally "scroll" the plurality of products 239 towards either a side box boundary 120a or an opposing side box boundary 120b in a direction illustrated by the arrow identified with the numeral 262. The command received may include the user swiping, using his or her hand or fingers, a portion of the computing device 35; tapping on a portion of the computing device 35 that corresponds with a "scroll right" button/indicator 265 or a "scroll left" button/indicator 270; moving a mouse; or turning a mouse wheel, etc.

At the step 234, the visual representations displayed in the dialogue box 120 are simultaneously moved along the longitudinal axis of the box 120 and towards the side box boundary 120a or 120b. In response to the receipt of the scrolling command, the system 10 simultaneously scrolls or moves the plurality of products 239 to hide a portion of the plurality of products 239 and reveal another portion of the plurality of products 239. That is, the portion of the plurality of products 239 that is not initially viewable by the user can be scrolled right (towards the side box boundary 120a) or left (towards the side box boundary 120b) to become viewable to the user.

At the step 235, a second filter parameter is requested using the dialogue box 125. The second filter parameter is different from the first filter parameter, to allow for further refinement and filtering of products. The step 235 is substantially similar to the step 210 and no further detail will be provided here.

At the step 240, the second filter parameter is received via the dialogue box 165. The step 240 is substantially similar to the step 215 and no further detail will be provided here.

At the step 245, the second filter parameter is displayed using the dialogue box 165. The step 245 is substantially similar to the step 220 and no further detail will be provided here.

At the step 250, the first filtered subset of products 239 is filtered based on the second filter parameter to produce a second filtered subset of products 246. Filtering the second plurality of products 239 based on the second filter parameter results in a non-conforming subset of products. That is, the portion that does not conform to the second filter parameter is considered "filtered-out" by the second input parameter. The portion that does conform to the second filter parameter forms a conforming subset of the plurality of products that is the second filtered subset of products 246.

The step 250 is substantially similar to the step 225 and no further detail will be provided here.

Figure 9:
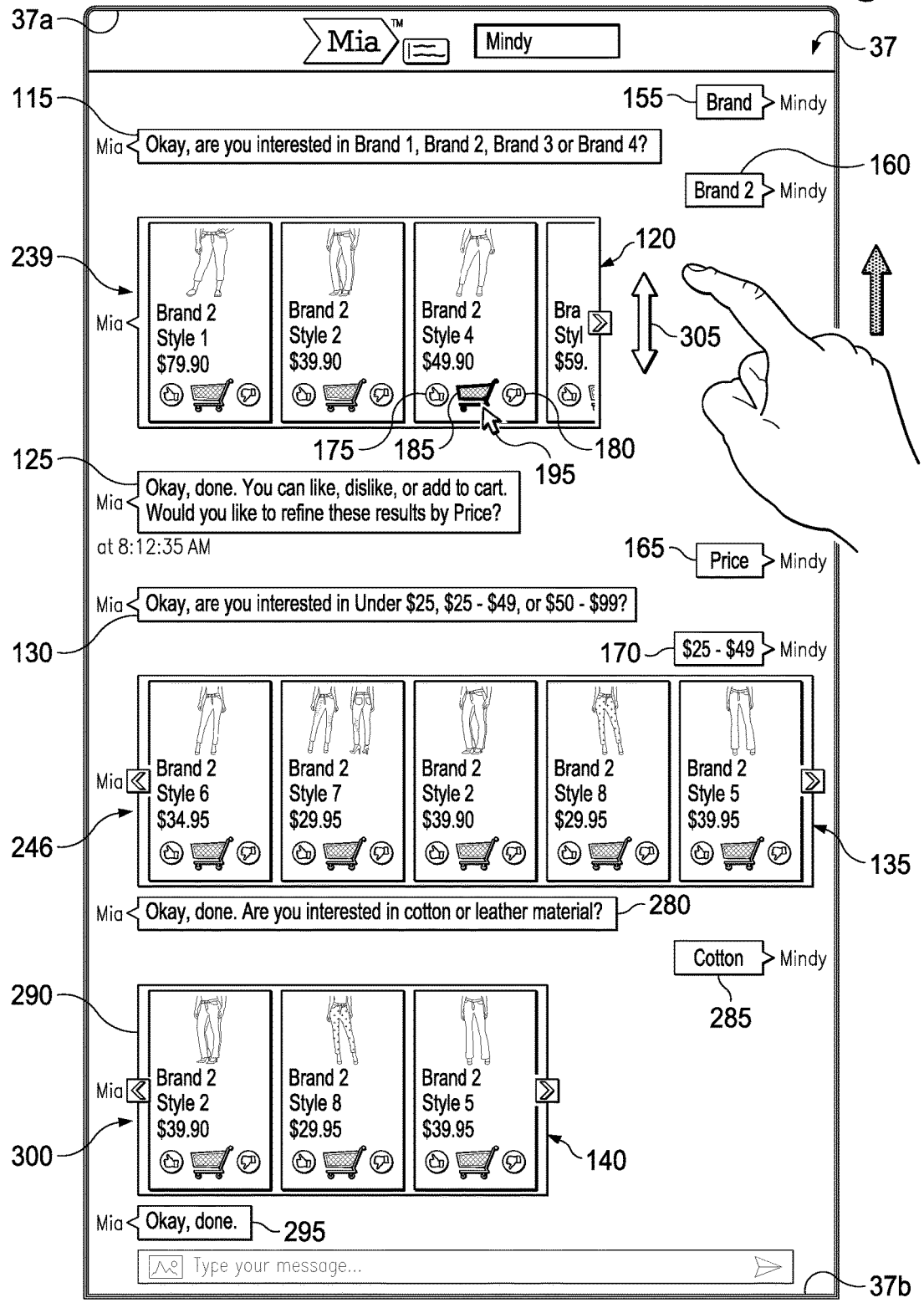
FIG. 9 is another illustration of the chat session of FIG. 5 during the execution of another step of the method of FIGS. 7A and 7B, according to an example embodiment.

At the step 255, the product information for each product in the second filtered subset of products 246 is displayed using the dialogue box 135. The step 255 is substantially similar to the step 230 and no further detail will be provided here. The process of receiving an input parameter, filtering the products, and displaying the results of the most recent filter can continue, resulting in the dialogue boxes 280, 285, 290, and 295 in which the dialogue box 290 displays a third filtered subset of products 300 (shown in FIG. 9). As illustrated in FIGS. 5 and 9, the dialogue boxes 100-170 and 280-295 are stacked vertically, such that the dialogue box 110 is vertically below the dialogue box 105, the dialogue box 155 is vertically below the dialogue boxes 105 and 110 and so on. This vertical stacking of the dialogue boxes 100-170 and 280-295 forms a visual representation of a historical search record of products.

The step 260 includes two sub-steps: moving or scrolling a visual representation of the historical search record at sub-step 260a and adding a product directly to a virtual shopping cart at sub-step 260b, with neither, either or both steps being completed during the method 200.

Figure 10:
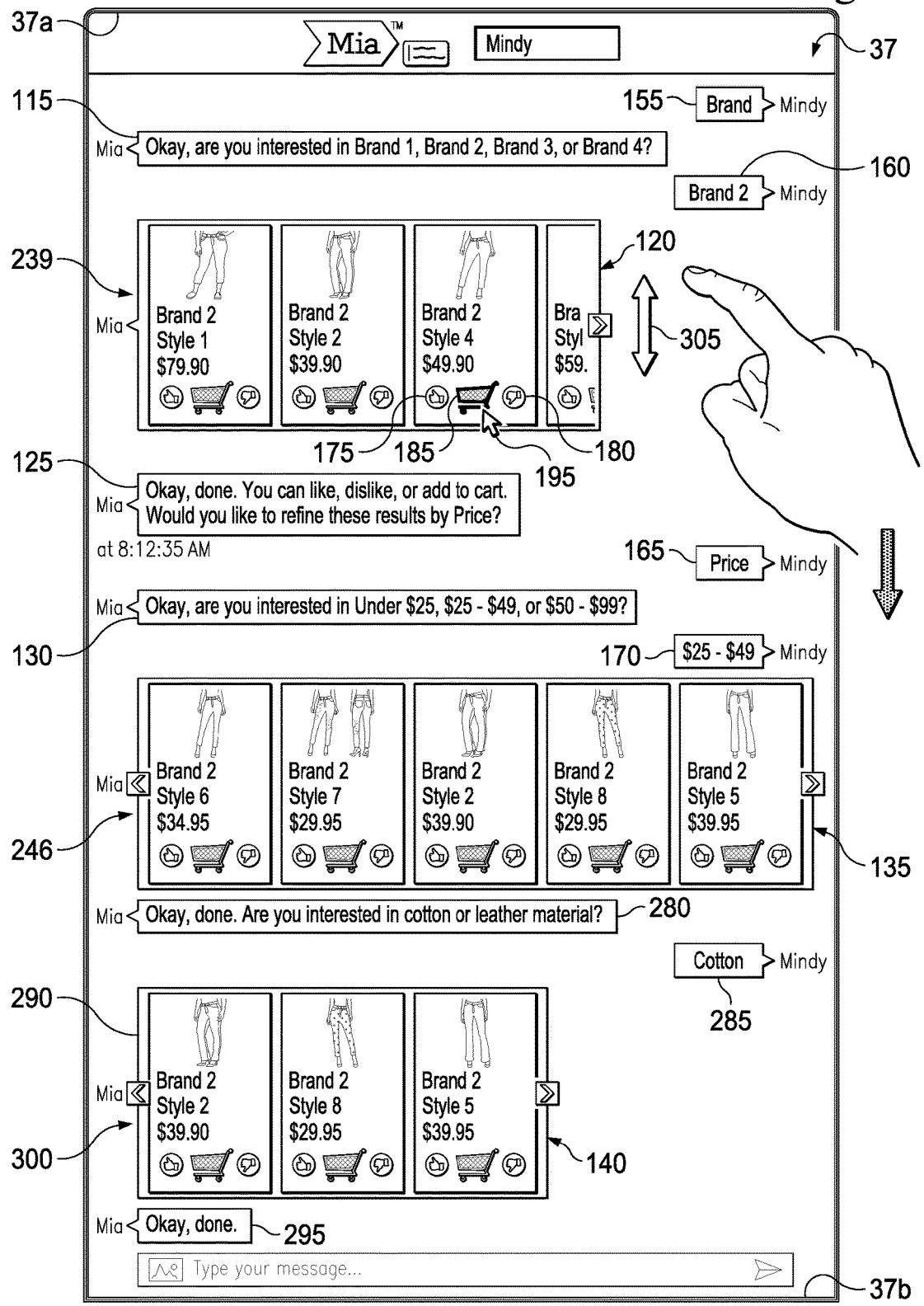
FIG. 10 is an illustration of the chat session of FIG. 9 during the execution of yet another step of the method of FIGS. 7A and 7B, according to an example embodiment.
Figure 11:
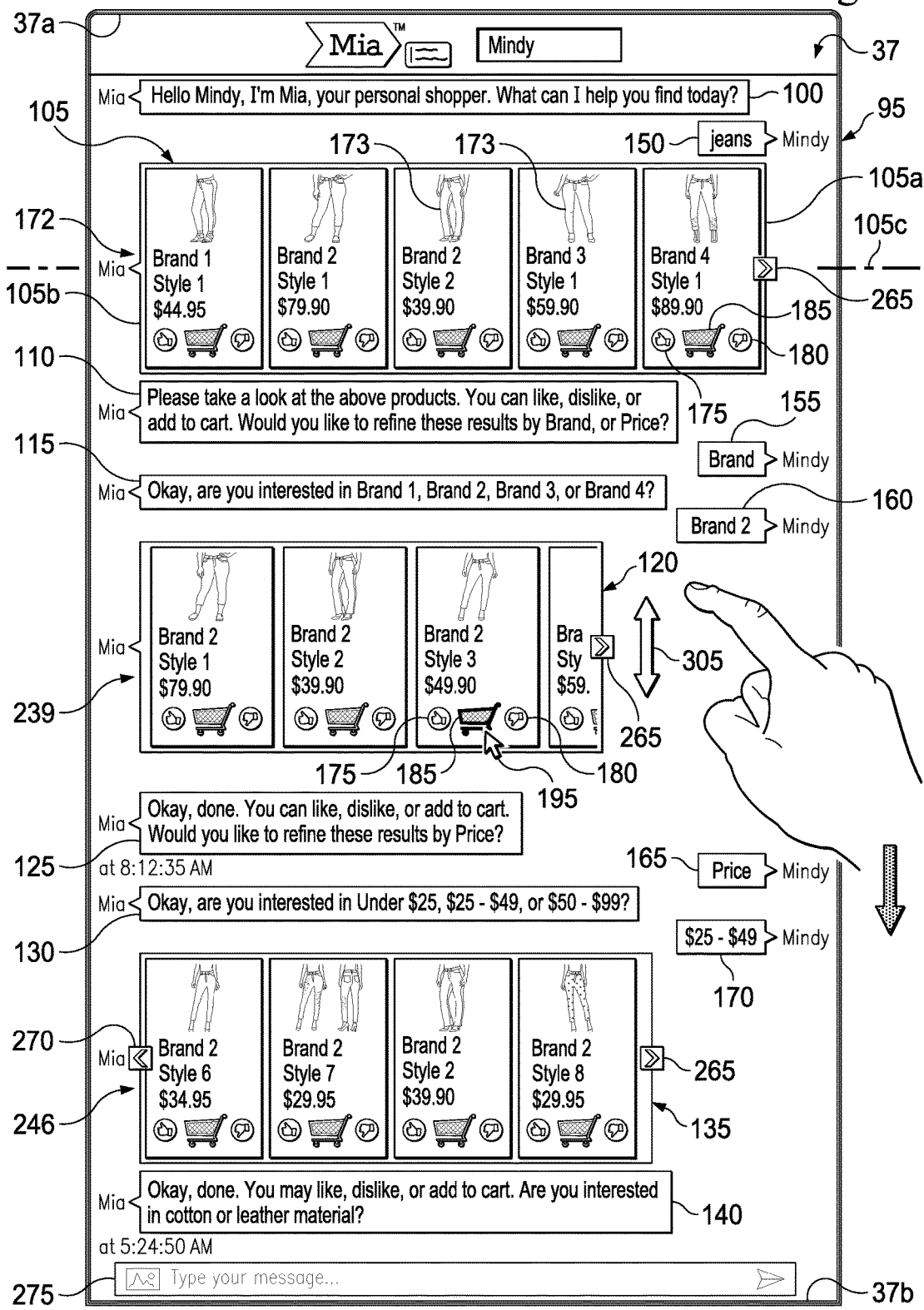
FIG. 11 is another illustration of the chat session of FIG. 10 during the execution of the yet another step of the method of FIGS. 7A and 7B, according to an example embodiment.

At the step 260a, a visual representation of the historical search record is moved. The step 260a includes two sub-steps: receiving a scrolling command from the user at step 260aa; and at step 260ab simultaneously moving the dialogue boxes 105-170 and 280-295 towards either the lower interface boundary 37b or the upper interface boundary 37a in response to receiving the scrolling command at the step 260ab. As the number of dialogue boxes displayed on the GUI 37 increases, some of the boxes 105-170 and 280 and 295 may extend beyond the upper or lower boundaries 37a and 37b such that a portion of the chat session 95 is not visible to the user. Receiving the command to scroll the dialogue boxes or the chat session 95 towards either the lower interface boundary 37b or the upper interface boundary 37a is substantially similar to receiving the command to scroll the products along a longitudinal axis of one of the boxes except for the command to scroll the visual representations within a dialogue box is a command to scroll along the longitudinal axis while the command to scroll the boxes 105-170 and 280-295 is a command to scroll the boxes towards either the lower interface boundary 37b or the upper interface boundary 37a. At the step 260ab and as shown in FIGS. 5 and 9, as the user scrolls the chat session 95 upwards in the vertical direction towards the upper boundary 37a, the previously hidden dialogue boxes 280, 285, 290, and 295 are displayed and are viewable by the user. As illustrated in FIGS. 10 and 11, scrolling the dialogue boxes 105-170 and 280-295 in the vertical direction towards the lower boundary 37b permits the user to view the plurality of products 172 and the first filtered subset of products 239, which are associated with product searches having fewer input parameters than the second filtered subset of products 246 and the third filtered subset of products 300. As the dialogue boxes 105-170 and 280-295 form a visual representation of the historical search record, scrolling the dialogue boxes 105-170 and 280-295 permits the review of the historical search record of products.

At the step 260b, a product is added directly to the virtual shopping cart. The step 260b includes two sub-steps: receiving a selection command selecting one of the add-to-cart indicators displayed in the dialogue box 290, the dialogue box 135, the dialogue box 120, or the dialogue box 105 at step 260ba; and adding, in response to receiving the selection command, the one selected product to a virtual shopping cart of the user while simultaneously displaying, between the upper and lower boundaries 37a and 37b, at least a portion of the visual representation of the historical search record at step 260bb. At the step 260ba, the selection command is received via the add-to-cart indicator 185 associated with one product displayed in the dialogue boxes 105, 120, 135, and 290. Generally, selection of the product is performed by a single action by the user (e.g., selection of the add-to cart indicator 185). The selection command is received via the user clicking on the add-to-cart indicator 185 or otherwise selecting, via a swipe or otherwise, the add-to-cart indicator 185. At the step 260bb, the selected one product is automatically added to the virtual cart of the user while simultaneously viewing at least two of the dialogue box 105, 120, 135, or 290. That is, the selection of one "add-to-cart" indicator 185 of a product within the dialogue boxes 105, 120, 135, and 290 causes the add to cart integration application 65 to add the product to the virtual shopping cart associated with the user. As noted above, user information is stored in a memory, such as the database 20 and/or the database 30. In some instances, the one product added to the virtual cart of the user conforms to the user information stored in the memory. For example, when a clothing size of the user is stored in the database and/or the database 30 as user information, the system 10 will pre-populate the size of the product that is added to the virtual cart to conform to the clothing size of the user. Alternatively or additionally, a favorite color, a preferred color, etc. is saved as user information and the product added to the virtual cart can conform to the favorite color, the preferred color, etc. In other embodiments, the product is added to virtual shopping cart at the step 260bb, and at a later time, such as upon check out, the user then selects a clothing size for the product or edits the pre-populated size of the product. At the step 260bb, the selection of the add-to-cart indicator 185 of one product automatically adds the product to the virtual shopping cart of the user without opening another window or dialogue box that provides additional details regarding the product. Thus, the addition of the product is based on a single action by the user (the selection of the add-to-cart indicator 185). The avoidance of opening another window or dialogue box, such as a product page, reduces the processing load on the processor 35a of the computing device 35. In some instances, a product from the non-conforming subset of the plurality of products is added to the virtual shopping cart even through the product is a part of the non-conforming subset of the plurality of products and is no longer viewable in the dialogue boxes 120 and 135. In some instances, the first subset of products 239 and the second subset of products 246 are displayed in the dialogue boxes 120 and 135 while one product from the non-conforming subset of the plurality of products is added to the virtual shopping cart is selected, via the indicator 185, and added to the virtual shopping cart. In other instances, a product from any of the plurality of products 172, the first subset of products 239, the second subset of products 246, and the third subset of products 300 is added to the virtual shopping cart without the opening of an additional window or dialogue box that contains additional product information. The structure of the GUI 37 is altered by the display of the dialogue boxes 105, 120, 135, and 290, which enables the addition of the product that is in a non-conforming subset to the virtual shopping cart, even after the filtering of the plurality of products using the filter parameter or input parameter.

In an example embodiment, the method 200 also includes receiving an indication from the user that the product is intended for a person other than the user, accessing a user profile for that person, filtering a plurality of products based on the user profile for that person, and storing received feedback from the user regarding the other person's preferences, etc. When a user engages with the system 10 to shop for someone else, the Mia Middleware 15 creates a recipient user profile representing the "Other" person, and asks the user some questions to learn more about the recipient. The Mia Middleware 15 "remembers" these answers for future sessions, and creates a personalization profile for this recipient to help the user shop for this recipient again.

As noted above and generally in e-commerce, the user, when searching for a specific product, navigates through multiple general category pages and eventually down to a desired sub-category or sub-sub-category product page. This navigation to the desired sub-category product page may occur through the application of filters to filter out the products that do not meet the user's desired attributes, such as price, etc. Normally, when presented with a first selection of products on a first category webpage, the user must click on, or otherwise select, his or her filter parameter, which then replaces the first webpage with a second webpage displaying a second selection (based on the filter parameter) of products. These filter parameters are often located on left-hand filtering sidebar of the category page. Alternatively, the user may choose to open a new tab or browsing session such that the second webpage is displayed separately from the first webpage, in order to preserve the first webpage. Thus, when the user wishes to remove the filter parameter to view the first selection of products on the first webpage, the user must either remove the filter parameter from the second webpage such that the first webpage displaying the first selection of products is displayed again, hit a "back" button to again display the first webpage with the first selection of products, or click between the tabs associated with each of the first and second webpages. Each of the actions requires a click-based (or equivalent) action from the user to toggle between the first and second webpages, and thus first and second selections of products. Thus, the user is not provided a visual representation of the first selection of products while simultaneously viewing the second selection of products at a location that indicates the search and/or filter order relative to the first selection of products. This can slow the selection process or even prevent the user from selecting a product, as the user often is "lost" during the navigation between category and sub-category pages. Often, even when the user finds and is ready to purchase a product, the user is required to visit the product page to add the product to the user's electronic shopping cart.

Human or bot-created chat/messaging interactions with the user can simplify product searches for the consumer, but the method of filtering through the category pages to category sub-pages is generally the same except that the user is "asked" questions that correspond with the filters. That is, instead of the user selecting a size 8 in a left-hand filtering sidebar, the user responds with "size 8" via a dialogue box when asked which size he or she is looking for. When a desired product is displayed in the dialogue box, the user is required to click-through to a product page, at which point the user can add the product to the user's electronic shopping cart. As the user is required to click-through to the product page prior to adding the product to the user's shopping cart, the user is less likely to return to the dialogue and/or less likely to purchase the selected item.

Unlike existing applications and/or webpages, the chat session 95 allows for the user to see both the first selection of products and the second selection of products simultaneously. Moreover, the relative location of the first selection relative to the second selection provides a vertical breadcrumb trail for the user of the GUI 37. That is, due to the presentation of the dialogue boxes 105 and 120, the search history is evident to the user because the dialogue box 120 contains a subset of the products contained in the dialogue box 105. The filter parameters are also in view for the user to review via the dialogue boxes 155 and 160. For example, the first selection of products may be shown in the dialogue box 105. After receiving the input to show the brand "Brand 2" via the dialogue box 160, the Mia Middleware 15 presents the second selection of products in the dialogue box 120. The second selection of products is a subset of the first selection of products based on the filter parameter (i.e., brand of Brand 2). A third selection of products is presented via the dialogue box 135, with the third selection being a subset of the second selection based on another filter parameter (i.e., price between $25 and $49). The chat session 95 is configured such that the user is capable of scrolling up and down in the directions illustrated by the double sided arrow referred to by the numeral 305 as illustrated in FIGS. 5 and 9. As such, the dialogue boxes 100-170 provide a scrollable visual representation of previously presented products, including products that have been filtered out by filter parameters input by the user. The chat session 95 allows for a user to simultaneously view products from previous searches without the need to click "back" or click between webpages. Moreover, the chat session 95 allows for the user to view products from previous searches in an historical order. As such, if the user wishes to return to a previously filtered out product, the user may easily do so and even add the previously filtered out product to his or her cart. The presentation of multiple dialogue boxes, with at least a portion of the dialogue boxes presenting products, changes the structure of the user interface of the computing device 35 to solve a problem relating to e-commerce shopping. That is, the problem of users becoming lost, uninterested, or confused during an e-commerce shopping session due to the difficulty of navigating out of a specific sub-category product page or between sub-category product pages is overcome due to the scrolling visual display of dialogue boxes that include sets or subsets of products associated with product searches. Moreover, the ability of the user to add any variety of products directly to his or her cart via the chat session 95 allows for the chat session 95 to continue uninterruptedly, and thus, improves the likelihood of the user buying additional items or at least improves the likelihood of the user interacting further with the Mia Middleware 15 to provide additional inputs that can be used to further develop the user profile (hence leading to additional purchases at a later date). The system 10, and the chat session 95 specifically, allows the customer to add to his or her cart directly, a product that has been previously filtered out. That is, after the user has provided inputs that filters out a specific product, such as the "Brand 2 Classic Cropped . . . . 49.90" item shown in the dialogue box 120, the user can still add that specific product to his or her cart via the "add to cart" indicator 185 without deleting the filtering parameter that filtered out the specific product. The embedded "add to cart" indicator 185 in the dialogue boxes 105, 120, 135, and 290 within the chat session 95 reduces the time required for a user to add a product to his or her shopping cart and eliminates the step of the user loading the product page. The reduction or elimination of the number of screens that must be displayed on the computing device 35 before the user is able to add the product to his or her cart reduces the processing load on the processor 35a of the computing device 35. Switching between different screens or opening a webpage requires loading of the different screens/webpages to display on the computing device 35. This, in turn, increases the processing load on the computing device 35. Eliminating the need to click through to a product webpage results in a reduction or elimination of the total number of screens that must be displayed in order for the user to add the product to his or her cart. This, in turn, reduces the processing load on the computing device 35. Reducing the processing load on the computing device 35 improves the performance of the computing device 35 such that the available memory of the computing device 35 is increased, the processing capacity of the computing device 35 is increased, and the processing speed of the computing device 35 is increased. Thus, the arrangement of the dialogue boxes 100-170 and 280-295 and specifically the display of the dialogue boxes 105, 120, 135, and 290 on the GUI 37, the scrollability of the chat session 95, and/or the ability to directly add any of the products presented in the dialogue boxes 105, 120, 135, and 290 to a user's cart—regardless of whether a product has since been filtered out due to later filter parameters being applied—addresses and resolves the problems with conventional systems that are identified above and improves the performance and functioning of the computing device 35 itself.

In an example embodiment, the chat session 95 provides a scrollable, visual representation of historical product searches having direct shopping cart links.

Conversational Commerce, or the method 200, is a new user experience that revolutionizes online search and navigation, a process that is inherently limited to unidirectional communication, by replacing it with conversation powered by the AI 25 and the Mia Middleware 15. Conversational Commerce learns about the user by means which are not available to existing search and navigation. The two-way conversation is used to eliminate irrelevant products within the shopping process. Conversational Commerce is different from search and navigation, the existing methods for online shopping, because Conversational Commerce uses conversational dialog as its interface instead of the traditional "search bar" and "left navigation". Moreover, a conversational interface is more appealing to users since dialogue is how users would normally interact with the world. Conversational Commerce is a bi-directional communication experience between the user and the Mia Middleware 15, which is an artificial intelligence agent. This allows the Mia Middleware 15 to ask users explicit questions about products to gather more information than what can normally be encoded in search and navigation. These questions are generated by the "Mia Dialog Engine," which uses the information from the chat session 95 combined with Natural Language Processing to determine what questions should be asked to the user to collect the information necessary to make relevant product recommendations. Prior to the system 10, the only way to get a recommendation for a product by describing a user's likes, dislikes, and needs was to go to a store and talk to a salesperson or hire a personal shopper. The Mia Middleware 15 fulfills these roles and even goes further by automating the processes of providing a conversational shopping experience.

The prior art and status quo for internet shopping is "search and navigation", which, as noted above, requires a user to input a search query into a "search bar" or clicks on categories, sub-categories or filters in the "left navigation", and the website returns a list of products that relate to that search query or navigation.

The prior art and status quo for in-store shopping is based around customer service. That is, a shopper can ask an employee in the store for assistance, recommendations and opinions to make a decision about which product(s) to buy. Moreover, "Search" and "Navigation" in internet shopping are an inherently single-directional data flow. While "In-store" shopping provides a conversational data flow, it relies on having one employee per shopper available at any given time. This type of experience could be delivered manually using a call-center approach where humans are responding on the chat interfaces. Conversational Commerce combines these two previous methods, automates the experience of shopping with a personal shopper, and enhances both experiences by utilizing the actionable insights that are produced by the Mia Middleware 15.

Using the Mia Middleware 15, and when a user begins the chat session 95, the Mia Middleware 15 generates additional questions to refine the search to guide the user to a more refined list of products. Moreover, using the Mia Middleware 15, data relating to a user (or a recipient user) and a retailer's collection of products is transformed into a collection of recommendations. Using the Mia Middleware 15, conversational search queries are automatically tailored by a user's preferences and interaction with the Mia Middleware 15. Using the Mia Middleware 15 and when retrieving a list of relevant products, the products are ranked with a preference score ("Preference Rank" block) and filtered by the relevant query search space. In some embodiments, sales conversion is optimized by examining personality characteristics in social media profiles and other expressions of a user's personality in Conversational Commerce. In some embodiments, real-time discovery of a user's responsiveness to related product recommendations increases purchase size. In some embodiments, the Mia Middleware 15 offers a real-time solution to discovering users' shopping preferences in the absence of other data sources by using Conversational Commerce.

Generally, prior to the system 10, the only way to get a recommendation for a product was for a person to go to the store and talk to a salesperson and describe his or her likes, dislikes, and needs; hire a personal shopper; or rely on internet search and personalization. The system 10 fulfills all of these roles and, by gathering new kinds of data such as social media, as well as by asking users explicit questions, is able to deliver new types of user experiences such as the user experience described in Conversational Commerce. Moreover, the system 10 provides the following "services" based on its analysis of the retailer's sales, users, products, user shopping patterns, and enhanced user profile information: personal shopper; targeted one-to-one email campaigns; individualized recommendations; friendly special occasion hints; personalized text engagements; added product categories of products that customers are buying elsewhere; prediction of product mark-downs; and operational efficiencies through determining which stores should ship which orders/items.

The Mia Middleware 15 is an internet-based solution to a complex commercial/retail sales problem. In some embodiments, the actionable insights generated by the system 10 could be applied to different sales channels such as assisting a sales representative in physical stores (enhancing a salesperson's ability to make recommendations to a customer), providing insights in a virtual or augmented reality setting, and, its current delivery channel, internet and mobile-based chat.

Conventional e-shopping systems use 'point-in-time' algorithms and analysis on data that have been collected implicitly in order to predict user preferences in e-commerce. In the past, many complex solutions to gathering data about a user have been engineered because of the cone-way' user problem: a user's input goes only one way. This results in vast amounts of "implicit" data, such as tracking the location of a mouse cursor on the screen to measure a user's preference for the product. The system 10 provides improvements in that it changes the manner in which a user finds products from a "one-way" search and navigation to a "two-way" conversation. The system 10 also uses a novel two-way conversational approach for gathering new information from a user and enhances the user data gathered by retailers with new information shared by users to produce a comprehensive analysis of a user.

In several example embodiments, the computing device 35 is, or includes, a tablet computer, a smartphone, a telephone, a personal computer, a personal digital assistant, a cellular telephone, other types of telecommunications devices, other types of computing devices, and/or any combination thereof. In several example embodiments, the computing device 35 includes a plurality of remote user devices. In an example embodiment, the computing device 35 is capable of running or executing an application. In one or more example embodiments, the application is an application server, which in several example embodiments includes and/or executes one or more web-based programs, Intranet-based programs, and/or any combination thereof.

In an example embodiment, as illustrated in FIG. 10 with continuing reference to FIGS. 1-5, 6A, 6B, 7A, 7B, 8A, 8B, and 9, an illustrative node 1000 for implementing one or more of the example embodiments described above, illustrated in FIGS. 1-5, 6A, 6B, 7A, 7B, 8A, 8B, and 9, and/or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above, illustrated in FIGS. 1-5, 6A, 6B, 7A, 7B, 8A, 8B, and 9, include at least the node 1000 and/or components thereof, and/or one or more nodes that are substantially similar to the node 1000 and/or components thereof.

In several example embodiments, one or more of the applications, systems, and application programs described above, illustrated in FIGS. 1-5, 6A, 6B, 7A, 7B, 8A, 8B, and 9, and/or any combination thereof, include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computing device or computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In an example embodiment, the network 38 includes the Internet, one or more local area networks, one or more wide area networks, one or more cellular networks, one or more wireless networks, one or more voice networks, one or more data networks, one or more communication systems, and/or any combination thereof.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system 10, one or more other processors, or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method that includes: providing a graphical user interface, the graphical user interface defining a first interface boundary and an opposing second interface boundary spaced therefrom, wherein the graphical user interface is adapted to display a plurality of dialogue boxes during an electronic chat session; displaying, in a first dialogue box within the electronic chat session, product information for a plurality of products; wherein the product information for each product includes: a visual representation of the product; and an add-to-cart indicator that is associated with the product and that is selectable by a user; after displaying the first dialogue box, receiving by a processor, a first filter parameter from the user; displaying the first filter parameter in a second dialogue box within the electronic chat session; filtering the plurality of products based on the first filter parameter to produce a first filtered subset of products; displaying, in a third dialogue box within the electronic chat session, the product information for each product in the first filtered subset of products; after displaying the first, second, and third dialogue boxes, receiving a second filter parameter from the user; displaying the second filter parameter in a fourth dialogue box within the electronic chat session; filtering the first filtered subset of products based on the second filter parameter to produce a second filtered subset of products; displaying, in a fifth dialogue box within the electronic chat session, the product information for each product in the second filtered subset of products; wherein the second dialogue box is located between the first dialogue box and the second interface boundary, the third dialogue box is located between the second dialogue box and the second interface boundary, the fourth dialogue box is located between the third dialogue box and the second interface boundary, and the fifth dialogue box is located between the fourth dialogue box and the second interface boundary, to form a visual representation of a historical search record of products; receiving, by the processor, a first scrolling command from the user; and in response to receiving the first scrolling command, simultaneously moving the first, second, third, fourth, and fifth dialogue boxes towards the second interface boundary of the graphical user interface, thereby permitting, within the electronic chat session itself: a review of the historical search record of products; and the selection of one or more of the add-to-cart indicators displayed in any of the fifth, third, or first dialogue boxes. In an example embodiment, receiving, by the processor, a selection command selecting one of the add-to-cart indicators displayed in the fifth dialogue box, the third dialogue box, or the first dialogue box; and in response to receiving the selection command, automatically adding the product associated with the selected add-to-cart indicator to a virtual shopping cart associated with the user while simultaneously displaying, between the first and second interface boundaries, at least a portion of the visual representation of the historical search record. In an example embodiment, the method further including storing user information, relating to either the user or another person, in a memory that is in communication with the processor; wherein the product added to the virtual shopping cart conforms to the user information. In an example embodiment, the user information is a first clothing size and the product added to the virtual shopping cart conforms to the first clothing size. In an example embodiment, the automatic addition, to the virtual shopping cart, of the product that conforms to the user information, occurs automatically without opening another window that provides additional details regarding the product. In an example embodiment, the graphical user interface is displayed on a computing device that includes the processor; and wherein the automatic addition, to the virtual shopping cart, of the product without opening another window that provides additional details regarding the product, reduces the processing load on the computing device. In an example embodiment, each of the first, third, and fifth dialogue boxes, respectively, defines a first side box boundary and an opposing second side box boundary; and wherein the method further includes: receiving, by the processor, a second scrolling command from the user; and in response to receiving the second scrolling command, simultaneously moving the visual representations displayed in the first, third, or fifth dialogue box along a longitudinal axis thereof, and relative to the first and second side box boundaries of the first, third, or fifth dialogue box. In an example embodiment, wherein the product information for each product further includes a feedback indicator associated with the product; wherein the feedback indicator is selectable by the user; and wherein filtering the plurality of products is further based on the selection of one or more of the feedback indicators displayed in the first dialogue box.

The present disclosure also introduces a method that includes: providing a graphical user interface, the graphical user interface defining an first interface boundary and an opposing second interface boundary spaced therefrom, wherein the graphical user interface is adapted to display a chat session; displaying product information for a plurality of products in a first dialogue box within the chat session; wherein the product information for each product includes a visual representation of the product; after displaying the first dialogue box, receiving, by a processor that is operably coupled to the graphical user interface, an input parameter from a user; wherein the input parameter relates to a first subset of the plurality of products; displaying, in response to the receipt of the input parameter, a second dialogue box within the chat session at a location that is between the first dialogue box and the second interface boundary; wherein the second dialogue box includes the product information for the products in the first subset of the plurality of products; receiving, by the processor, a first scrolling command; and simultaneously moving the first dialogue box and the second dialogue box towards the second interface boundary of the graphical user interface in response to the receipt of the first scrolling command. In an example embodiment, each of the first and second dialogue boxes, respectively, defines a first side box boundary and an opposing second side box boundary; and the method further includes: receiving, by the processor, a second scrolling command; and simultaneously moving the visual representations displayed in the first or second dialogue box relative to the first and second side box boundaries of, and along a longitudinal axis of, the first or second dialogue box in response to the receipt of the second scrolling command. In an example embodiment, the method also includes displaying the input parameter in a third dialogue box within the chat session at a location that is between the first dialogue box and the second dialogue box; wherein the third dialogue box is moved simultaneously with the first and second dialogue boxes in response to simultaneously moving the first and second dialogue boxes. In an example embodiment, the product information for each product further includes one add-to-cart indicator associated with the product; and wherein each add-to-cart indicator is selectable by the user. In an example embodiment, the method further includes: receiving, by the processor, a selection command selecting one of the add-to-cart indicators displayed in the first dialogue box or the second dialogue box; and in response to the receipt of the selection command, adding the selected, associated one product to a virtual shopping cart of the user. In an example embodiment, the method further includes storing user information, relating to either the user or another person, in a memory that is in communication with the processor; and wherein the selected, associated one product that is added to the virtual shopping cart conforms to the user information. In an example embodiment, the user information is a first clothing size and the selected, associated one product that is added to the virtual shopping cart conforms to the first clothing size. In an example embodiment, the addition of the selected, associated one product to the virtual shopping cart occurs automatically without opening another dialogue box that provides additional details regarding the one product. In an example embodiment, the graphical user interface is displayed on a computing device that includes the processor; and the automatic addition, to the virtual shopping cart, of the selected, associated one product without opening another dialogue box that provides additional details regarding the one product, reduces the processing load on the computing device. In an example embodiment, the plurality of products includes: a non-conforming subset of products including products that do not conform to the input parameter; and a conforming subset of products including products that conform to the input parameter; wherein the first subset of the plurality of products is the conforming subset of products; wherein the method further includes: receiving, by the processor, a selection command selecting one of the add-to-cart indicators associated with one product in the non-conforming subset of products that is displayed in the first dialogue box; and adding, in response to the receipt of the selection command, the one product in the non-conforming subset of products to a virtual shopping cart of the user, while simultaneously displaying the visual representations of the conforming subset of products in the second dialogue box. In an example embodiment, the input parameter is a filter parameter; and the method further includes, before displaying the second dialogue box, filtering the plurality of products using the filter parameter to define the non-conforming subset of products and the conforming subset of products; and wherein the structure of the graphical user interface, as altered by the display of the first and second dialogue boxes, enables the addition of the one product in the non-conforming subset of products to the virtual shopping cart after the filtering of the plurality of products using the filter parameter. In an example embodiment, the plurality of products includes: a non-conforming subset of products including products that do not conform to the input parameter; and a conforming subset of products including products that conform to the input parameter; wherein the first subset of the plurality of products is the conforming subset of products; wherein the method further includes: receiving, by the processor, a selection command selecting one of the add-to-cart indicators associated with one product in the conforming subset of products that is displayed in the second dialogue box; and adding, in response to the receipt of the selection command, the one product in the conforming subset of products to a virtual shopping cart of the user, while simultaneously displaying the visual representations of the non-conforming subset of products in the first dialogue box. In an example embodiment, the product information for each product further includes one feedback indicator associated with the product; wherein each feedback indicator is selectable by the user; and wherein receiving the input parameter includes receiving a selection command selecting one or more respective feedback indicators for one or more of the products.

The present disclosure also introduces a method that includes: providing a graphical user interface, the graphical user interface defining a first interface boundary and an opposing second interface boundary spaced therefrom, wherein the graphical user interface is adapted to display a plurality of dialogue boxes during an electronic chat session; displaying, in a first dialogue box of the electronic chat session, product information for a plurality of products; wherein the product information for each product includes: a visual representation of the product; and an add-to-cart indicator that is associated with the product and that is selectable by the user; receiving, by a processor that is operably coupled to the graphical user interface, after displaying the first dialogue box, an input parameter from a user; wherein the input parameter defines a conforming subset of products within the plurality of products and a non-conforming subset of products within the plurality of products; displaying, in response to the receipt of the input parameter, the product information for the conforming subset of products in a second dialogue box at a location on the graphical user interface that is between the first dialogue box and the second interface boundary; receiving, by the processor, a selection command selecting one of the add-to-cart indicators displayed in the first dialogue box or the second dialogue box; and adding, in response to the receipt of the selection command, the one selected product to a virtual shopping cart of the user while simultaneously displaying the first and second dialogue boxes. In an example embodiment, the method further including storing user information, relating to either the user or another person, in a memory that is in communication with the processor; wherein the one selected product that is added to the virtual shopping cart conforms to the user information. In an example embodiment, the user information is a first clothing size and the one selected product that is added to the virtual shopping cart conforms to the first clothing size. In an example embodiment, the addition of the one selected product to the virtual shopping cart that conforms to the user information occurs automatically without opening another dialogue box that provides additional details regarding the one selected product. In an example embodiment, the graphical user interface is displayed on a computing device that includes the processor; and wherein the automatic addition, to the virtual shopping cart, of the one selected product without opening another dialogue box reduces the processing load on the computing device. In an example embodiment, the input parameter is a filter parameter; and the method further includes: before displaying the second dialogue box, filtering the plurality of products using the filter parameter to define the non-conforming subset of products and the conforming subset of products, wherein the selection command selects one of the add-to-cart indicators associated with one product in the non-conforming subset of products that is displayed in the first dialogue box; and adding, in response to the receipt of the selection command, the one product in the non-conforming subset of products to a virtual shopping cart of the user, while simultaneously displaying the visual representations of the conforming subset of products displayed in the second dialogue box; wherein the structure of the graphical user interface, as altered by the display of the first and second dialogue boxes, enables the addition of the one selected product in the non-conforming subset of products to the virtual shopping cart after the filtering of the plurality of products using the filter parameter. In an example embodiment, each of the first and second dialogue boxes, respectively, defines a first side box boundary and a second side box boundary spaced therefrom; and wherein the method further includes: receiving, by the processor, a second scrolling command; and simultaneously moving the visual representations displayed in the first or second dialogue box along a longitudinal axis thereof, and relative to the first and second side box boundaries of the first or second dialogue box in response to the receipt of the second scrolling command. In an example embodiment, the product information for each product further includes one feedback indicator associated with the product; wherein each feedback indicator is selectable by the user; and wherein receiving the input parameter includes receiving a selection command selecting one or more respective feedback indicators for one or more of the products. In an example embodiment, the first dialogue box is associated with first search results; wherein the second dialogue box is associated with results from filtering the first search results using the input parameter; and wherein the method further includes simultaneously moving the first dialogue box and the second dialogue box towards a first interface boundary that at least partially defines the graphical user interface to display the first search results after filtering the first search results using the input parameter.

The present disclosure introduces a non-transitory computer readable medium, the non-transitory computer readable medium comprising a plurality of instructions stored thereon, wherein the plurality of instructions are executable by a processor, and wherein the plurality of instructions includes: instructions that cause the processor to display on a graphical user interface, which defines a first interface boundary and an opposing second interface boundary spaced therefrom and is adapted to display a plurality of dialogue boxes during an electronic chat session, in a first dialogue box within the electronic chat session, product information for a plurality of products; wherein the product information for each product includes: a visual representation of the product; and an add-to-cart indicator that is associated with the product and that is selectable by a user. The plurality of instructions includes also includes instructions that cause the processor to, after displaying the first dialogue box, receive a first filter parameter from the user; instructions that cause the processor to display the first filter parameter in a second dialogue box within the electronic chat session; instructions that cause the processor to filter the plurality of products based on the first filter parameter to produce a first filtered subset of products; instructions that cause the processor to display, in a third dialogue box within the electronic chat session, the product information for each product in the first filtered subset of products; instructions that cause the processor to, after displaying the first, second, and third dialogue boxes, receive a second filter parameter from the user; instructions that cause the processor to display the second filter parameter in a fourth dialogue box within the electronic chat session; instructions that cause the processor to filter the first filtered subset of products based on the second filter parameter to produce a second filtered subset of products; instructions that cause the processor to display, in a fifth dialogue box within the electronic chat session, the product information for each product in the second filtered subset of products; wherein the second dialogue box is located between the first dialogue box and the second interface boundary, the third dialogue box is located between the second dialogue box and the second interface boundary, the fourth dialogue box is located between the third dialogue box and the second interface boundary, and the fifth dialogue box is located between the fourth dialogue box and the second interface boundary, to form a visual representation of a historical search record of products; instructions that cause the processor to receive a first scrolling command from the user; and instructions that cause the processor to, in response to receiving the first scrolling command, simultaneously move the first, second, third, fourth, and fifth dialogue boxes towards the second interface boundary of the graphical user interface, thereby permitting, within the electronic chat session itself: a review of the historical search record of products; and the selection of one or more of the add-to-cart indicators displayed in any of the fifth, third, or first dialogue boxes. In an example embodiment, the plurality of instructions further includes instructions that cause the processor to receive a selection command selecting one of the add-to-cart indicators displayed in the fifth dialogue box, the third dialogue box, or the first dialogue box; and instructions that cause the processor to, in response to receiving the selection command, automatically add the product associated with the selected add-to-cart indicator to a virtual shopping cart associated with the user while simultaneously displaying, between the first and second interface boundaries, at least a portion of the visual representation of the historical search record. In an example embodiment, the plurality of instructions further includes instructions that cause the processor to store user information, relating to either the user or another person, in a memory that is in communication with the processor; wherein the product added to the virtual shopping cart conforms to the user information. In an example embodiment, the user information is a first clothing size and the product added to the virtual shopping cart conforms to the first clothing size. In an example embodiment, the automatic addition, to the virtual shopping cart, of the product that conforms to the user information, occurs automatically without opening another window that provides additional details regarding the product. In an example embodiment, the automatic addition, to the virtual shopping cart, of the product without opening another window that provides additional details regarding the product, reduces the processing load on the processor. In an example embodiment, each of the first, third, and fifth dialogue boxes, respectively, defines a first side box boundary and an opposing second side box boundary; and wherein the plurality of instructions further includes instructions that cause the processor to receive a second scrolling command from the user; and instructions that cause the processor to, in response to receiving the second scrolling command, simultaneously move the visual representations displayed in the first, third, or fifth dialogue box along a longitudinal axis thereof, and relative to the first and second side box boundaries of the first, third, or fifth dialogue box. In an example embodiment, the product information for each product further includes a feedback indicator associated with the product; the feedback indicator is selectable by the user; and wherein the instructions that cause the processor to filter the plurality of products also uses the selection of one or more of the feedback indicators displayed in the first dialogue box.

The present disclosure introduces a non-transitory computer readable medium, the non-transitory computer readable medium comprising a plurality of instructions stored thereon, wherein the plurality of instructions are executable by a processor, and wherein the plurality of instructions includes: instructions that cause the processor to display on a graphical user interface, which defines a first interface boundary and an opposing second interface boundary spaced therefrom and is adapted to display an electronic chat session, product information for a plurality of products in a first dialogue box within the chat session; wherein the product information for each product includes a visual representation of the product; instructions that cause the processor to, after displaying the first dialogue box, receive an input parameter from a user; wherein the input parameter relates to a first subset of the plurality of products; instructions that cause the processor to display, in response to the receipt of the input parameter, a second dialogue box within the chat session at a location that is between the first dialogue box and the second interface boundary; wherein the second dialogue box includes the product information for the products in the first subset of the plurality of products; instructions that cause the processor to receive a first scrolling command; and instructions that cause the processor to simultaneously move the first dialogue box and the second dialogue box towards the second interface boundary of the graphical user interface in response to the receipt of the first scrolling command. In an example embodiment, each of the first and second dialogue boxes, respectively, defines a first side box boundary and an opposing second side box boundary; and wherein the plurality of instructions further includes instructions that cause the processor to receive a second scrolling command; and instructions that cause the processor to simultaneously move the visual representations displayed in the first or second dialogue box relative to the first and second side box boundaries of, and along a longitudinal axis of, the first or second dialogue box in response to the receipt of the second scrolling command. In an example embodiment, the plurality of instructions further includes instructions that cause the processor to display the input parameter in a third dialogue box within the chat session at a location that is between the first dialogue box and the second dialogue box; wherein the third dialogue box is moved simultaneously with the first and second dialogue boxes in response to simultaneously moving the first and second dialogue boxes. In an example embodiment, the product information for each product further includes one add-to-cart indicator associated with the product; and wherein each add-to-cart indicator is selectable by the user. In an example embodiment, the plurality of instructions further includes instructions that cause the processor to receive a selection command selecting one of the add-to-cart indicators displayed in the first dialogue box or the second dialogue box; and instructions that cause the processor to, in response to the receipt of the selection command, add the selected, associated one product to a virtual shopping cart of the user. In an example embodiment, the plurality of instructions further includes instructions that cause the processor to store user information, relating to either the user or another person, in a memory that is in communication with the processor; and wherein the selected, associated one product that is added to the virtual shopping cart conforms to the user information. In an example embodiment, the user information is a first clothing size and the selected, associated one product that is added to the virtual shopping cart conforms to the first clothing size. In an example embodiment, the addition of the selected, associated one product to the virtual shopping cart occurs automatically without opening another dialogue box that provides additional details regarding the one product. In an example embodiment, the automatic addition, to the virtual shopping cart, of the product without opening another window that provides additional details regarding the product, reduces the processing load on the processor. In an example embodiment, the plurality of products includes: a non-conforming subset of products including products that do not conform to the input parameter; and a conforming subset of products including products that conform to the input parameter; wherein the first subset of the plurality of products is the conforming subset of products; wherein the plurality of instructions further includes instructions that cause the processor to receive a selection command selecting one of the add-to-cart indicators associated with one product in the non-conforming subset of products that is displayed in the first dialogue box; and instructions that cause the processor to add, in response to the receipt of the selection command, the one product in the non-conforming subset of products to a virtual shopping cart of the user, while simultaneously displaying the visual representations of the conforming subset of products in the second dialogue box. In an example embodiment, the input parameter is a filter parameter; and the plurality of instructions further includes instructions that cause the processor to, before displaying the second dialogue box, filter the plurality of products using the filter parameter to define the non-conforming subset of products and the conforming subset of products; and wherein the structure of the graphical user interface, as altered by the display of the first and second dialogue boxes, enables the addition of the one product in the non-conforming subset of products to the virtual shopping cart after the filtering of the plurality of products using the filter parameter. In an example embodiment, the plurality of products includes: a non-conforming subset of products including products that do not conform to the input parameter; and a conforming subset of products including products that conform to the input parameter; wherein the first subset of the plurality of products is the conforming subset of products; wherein the plurality of instructions further includes instructions that cause the processor to receive a selection command selecting one of the add-to-cart indicators associated with one product in the conforming subset of products that is displayed in the second dialogue box; and instructions that cause the processor to add, in response to the receipt of the selection command, the one product in the conforming subset of products to a virtual shopping cart of the user, while simultaneously displaying the visual representations of the non-conforming subset of products in the first dialogue box. In an example embodiment, the product information for each product further includes one feedback indicator associated with the product; wherein each feedback indicator is selectable by the user; and wherein instructions that cause the processor to receive the input parameter includes instructions that cause the processor to receive a selection command selecting one or more respective feedback indicators for one or more of the products.

The present disclosure introduces a non-transitory computer readable medium, the non-transitory computer readable medium comprising a plurality of instructions stored thereon, wherein the plurality of instructions are executable by a processor, and wherein the plurality of instructions includes: instructions that cause the processor to display on a graphical user interface, which defines a first interface boundary and an opposing second interface boundary spaced therefrom and is adapted to display a plurality of dialogue boxes during an electronic chat session, in a first dialogue box of the electronic chat session, product information for a plurality of products; wherein the product information for each product includes: a visual representation of the product; and an add-to-cart indicator that is associated with the product and that is selectable by the user; instructions that cause the processor to receive, after displaying the first dialogue box, an input parameter from a user; wherein the input parameter defines a conforming subset of products within the plurality of products and a non-conforming subset of products within the plurality of products; instructions that cause the processor to display, in response to the receipt of the input parameter, the product information for the conforming subset of products in a second dialogue box at a location on the graphical user interface that is between the first dialogue box and the second interface boundary; instructions that cause the processor to receive a selection command selecting one of the add-to-cart indicators displayed in the first dialogue box or the second dialogue box; and instructions that cause the processor to add, in response to the receipt of the selection command, the one selected product to a virtual shopping cart of the user while simultaneously displaying the first and second dialogue boxes. In an example embodiment, the plurality of instructions further includes instructions that cause the processor to store user information, relating to either the user or another person, in a memory that is in communication with the processor; wherein the one selected product that is added to the virtual shopping cart conforms to the user information. In an example embodiment, the user information is a first clothing size and the one selected product that is added to the virtual shopping cart conforms to the first clothing size. In an example embodiment, the addition of the one selected product to the virtual shopping cart that conforms to the user information occurs automatically without opening another dialogue box that provides additional details regarding the one selected product. In an example embodiment, the automatic addition, to the virtual shopping cart, of the product without opening another window that provides additional details regarding the product, reduces the processing load on the processor. In an example embodiment, the input parameter is a filter parameter; and the plurality of instructions further includes instructions that cause the processor to, before displaying the second dialogue box, filter the plurality of products using the filter parameter to define the non-conforming subset of products and the conforming subset of products, wherein the selection command selects one of the add-to-cart indicators associated with one product in the non-conforming subset of products that is displayed in the first dialogue box; and instructions that cause the processor to add, in response to the receipt of the selection command, the one product in the non-conforming subset of products to a virtual shopping cart of the user, while simultaneously displaying the visual representations of the conforming subset of products displayed in the second dialogue box; wherein the structure of the graphical user interface, as altered by the display of the first and second dialogue boxes, enables the addition of the one selected product in the non-conforming subset of products to the virtual shopping cart after the filtering of the plurality of products using the filter parameter. In an example embodiment, each of the first and second dialogue boxes, respectively, defines a first side box boundary and a second side box boundary spaced therefrom; and wherein the plurality of instructions further includes instructions that cause the processor to receive a second scrolling command; and instructions that cause the processor to simultaneously move the visual representations displayed in the first or second dialogue box along a longitudinal axis thereof, and relative to the first and second side box boundaries of the first or second dialogue box in response to the receipt of the second scrolling command. In an example embodiment, the product information for each product further includes one feedback indicator associated with the product; wherein each feedback indicator is selectable by the user; and wherein instructions that cause the processor to receive the input parameter includes instructions that cause the processor to receive a selection command selecting one or more respective feedback indicators for one or more of the products. In an example embodiment, the first dialogue box is associated with first search results; wherein the second dialogue box is associated with results from filtering the first search results using the input parameter; and wherein the plurality of instructions further includes instructions that cause the processor to simultaneously move the first dialogue box and the second dialogue box towards a first interface boundary that at least partially defines the graphical user interface to display the first search results after filtering the first search results using the input parameter.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method comprising:
   providing a graphical user interface, the graphical user interface defining a first interface boundary and an opposing second interface boundary spaced therefrom, wherein the graphical user interface is adapted to display a plurality of dialogue boxes during an electronic chat session;

displaying, in a first dialogue box within the electronic chat session, product information for a plurality of products;
    wherein the product information for each product comprises:
        a visual representation of the product; and
        an add-to-cart indicator that is associated with the product and that is selectable by a user;
after displaying the first dialogue box, receiving by a processor, a first filter parameter from the user;
displaying the first filter parameter in a second dialogue box within the electronic chat session;
filtering the plurality of products based on the first filter parameter to produce a first filtered subset of products;
displaying, in a third dialogue box within the electronic chat session, the product information for each product in the first filtered subset of products;
after displaying the first, second, and third dialogue boxes, receiving a second filter parameter from the user;
displaying the second filter parameter in a fourth dialogue box within the electronic chat session;
filtering the first filtered subset of products based on the second filter parameter to produce a second filtered subset of products;
displaying, in a fifth dialogue box within the electronic chat session, the product information for each product in the second filtered subset of products;
    wherein the second dialogue box is located between the first dialogue box and the second interface boundary, the third dialogue box is located between the second dialogue box and the second interface boundary, the fourth dialogue box is located between the third dialogue box and the second interface boundary, and the fifth dialogue box is located between the fourth dialogue box and the second interface boundary to form a visual representation of a historical search record of products;
receiving, by the processor, a first scrolling command from the user; and
in response to receiving the first scrolling command, simultaneously moving the first, second, third, fourth, and fifth dialogue boxes towards the second interface boundary of the graphical user interface,
thereby permitting, within the electronic chat session itself: a review of the historical search record of products; and the selection of one or more of the add-to-cart indicators displayed in any of the fifth, third, or first dialogue boxes;
wherein the method further comprises:
    receiving, by the processor, a selection command selecting one of the add-to-cart indicators displayed in the fifth dialogue box, the third dialogue box, or the first dialogue box; and
    in response to receiving the selection command, automatically adding the product associated with the selected add-to-cart indicator to a virtual shopping cart associated with the user while simultaneously displaying, between the first and second interface boundaries, at least a portion of the visual representation of the historical search record;
wherein the automatic addition of the product to the virtual shopping cart occurs automatically without opening another window that provides additional details regarding the product;
wherein the graphical user interface is displayed on a computing device that comprises the processor; and
wherein the automatic addition, to the virtual shopping cart, of the product without opening another window that provides additional details regarding the product, reduces the processing load on the computing device.

2. The method of claim 1, the method further comprising storing user information relating to the user in a memory that is in communication with the processor;
    wherein the product added to the virtual shopping cart conforms to the user information.

3. The method of claim 2, wherein the user information is a first clothing size and the product added to the virtual shopping cart conforms to the first clothing size.

4. The method of claim 1,
    wherein each of the first, third, and fifth dialogue boxes, respectively, defines a first side box boundary and a second opposing side box boundary; and
    wherein the method further comprises:
        receiving, by the processor, a second scrolling command from the user; and
        in response to receiving the second scrolling command, simultaneously moving the visual representations displayed in the first, third, or fifth dialogue box along a longitudinal axis thereof, and relative to the first and second side box boundaries of, the first, third, or fifth dialogue box in response to a second scrolling command received by the processor and from the user.

5. The method of claim 1,
    wherein the product information for each product further comprises a feedback indicator associated with the product;
    wherein the feedback indicator is selectable by the user; and
    wherein filtering the plurality of products is further based on the selection of one or more of the feedback indicators displayed in the first dialogue box.

6. A system comprising a non-transitory computer readable medium and a plurality of instructions stored thereon and executable by one or more processors, the plurality of instructions comprising:
    instructions for providing a graphical user interface, the graphical user interface defining a first interface boundary and an opposing second interface boundary spaced therefrom, wherein the graphical user interface is adapted to display a plurality of dialogue boxes during an electronic chat session;
    instructions for displaying, in a first dialogue box within the electronic chat session, product information for a plurality of products;
        wherein the product information for each product comprises:
            a visual representation of the product; and
            an add-to-cart indicator that is associated with the product and that is selectable by a user;
    instructions for, after displaying the first dialogue box, a first filter parameter from the user;
    instructions for displaying the first filter parameter in a second dialogue box within the electronic chat session;
    instructions for filtering the plurality of products based on the first filter parameter to produce a first filtered subset of products;
    instructions for displaying, in a third dialogue box within the electronic chat session, the product information for each product in the first filtered subset of products;
    instructions for, after displaying the first, second, and third dialogue boxes, receiving a second filter parameter from the user;

instructions for displaying the second filter parameter in a fourth dialogue box within the electronic chat session;

instructions for filtering the first filtered subset of products based on the second filter parameter to produce a second filtered subset of products;

instructions for displaying, in a fifth dialogue box within the electronic chat session, the product information for each product in the second filtered subset of products;

wherein the second dialogue box is located between the first dialogue box and the second interface boundary, the third dialogue box is located between the second dialogue box and the second interface boundary, the fourth dialogue box is located between the third dialogue box and the second interface boundary, and the fifth dialogue box is located between the fourth dialogue box and the second interface boundary to form a visual representation of a historical search record of products;

instructions for receiving a first scrolling command from the user; and instructions for, in response to receiving the first scrolling command, simultaneously moving the first, second, third, fourth, and fifth dialogue boxes towards the second interface boundary of the graphical user interface, thereby permitting, within the electronic chat session itself: a review of the historical search record of products; and the selection of one or more of the add-to-cart indicators displayed in any of the fifth, third, or first dialogue boxes;

wherein the plurality of instructions further comprises:
instructions for receiving a selection command selecting one of the add-to-cart indicators displayed in the fifth dialogue box, the third dialogue box, or the first dialogue box; and instructions for, in response to receiving the selection command, automatically adding the product associated with the selected add-to-cart indicator to a virtual shopping cart associated with the user while simultaneously displaying, between the first and second interface boundaries, at least a portion of the visual representation of the historical search record;

wherein the automatic addition of the product to the virtual shopping cart occurs automatically without opening another window that provides additional details regarding the product;

wherein the graphical user interface is displayed on a computing device; and wherein the automatic addition, to the virtual shopping cart, of the product without opening another window that provides additional details regarding the product, reduces processing load on the computing device.

7. The system of claim 6, the plurality of instructions further comprising instructions for storing user information relating to the user in a memory;

wherein the product added to the virtual shopping cart conforms to the user information.

8. The system of claim 7, wherein the user information is a first clothing size and the product added to the virtual shopping cart conforms to the first clothing size.

9. The system of claim 6, wherein each of the first, third, and fifth dialogue boxes, respectively, defines a first side box boundary and a second opposing side box boundary; and wherein the plurality of instructions further comprises:
instructions for receiving a second scrolling command from the user; and instructions for, in response to receiving the second scrolling command, simultaneously moving the visual representations displayed in the first, third, or fifth dialogue box along a longitudinal axis thereof, and relative to the first and second side box boundaries of, the first, third, or fifth dialogue box in response to a second scrolling command received by the processor and from the user.

10. The system of claim 6, wherein the product information for each product further comprises a feedback indicator associated with the product;

wherein the feedback indicator is selectable by the user; and wherein filtering the plurality of products is further based on the selection of one or more of the feedback indicators displayed in the first dialogue box.

* * * * *